(12) United States Patent
Raghavan et al.

(10) Patent No.: US 12,470,271 B2
(45) Date of Patent: *Nov. 11, 2025

(54) BI-DIRECTIONAL BEAM REFINEMENT COORDINATION FOR WIRELESS SYSTEMS

(71) Applicant: QUALCOMM INCORPORATED, San Diego, CA (US)

(72) Inventors: Vasanthan Raghavan, West Windsor Township, NJ (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/561,887

(22) PCT Filed: Apr. 27, 2022

(86) PCT No.: PCT/US2022/071945
§ 371 (c)(1),
(2) Date: Nov. 17, 2023

(87) PCT Pub. No.: WO2022/251772
PCT Pub. Date: Dec. 1, 2022

(65) Prior Publication Data
US 2024/0171242 A1 May 23, 2024

Related U.S. Application Data

(63) Continuation of application No. 17/330,935, filed on May 26, 2021, now Pat. No. 11,595,094.

(51) Int. Cl.
*H04L 1/02* (2006.01)
*H04B 7/06* (2006.01)
*H04W 72/20* (2023.01)

(52) U.S. Cl.
CPC ........... *H04B 7/0617* (2013.01); *H04B 7/063* (2013.01); *H04B 7/06958* (2023.05); *H04W 72/20* (2023.01)

(58) Field of Classification Search
CPC ....... H04L 1/0618; H04L 1/06; H04L 5/0055; H04B 7/0491; H04B 7/0695;
(Continued)

(56) References Cited

U.S. PATENT DOCUMENTS 11,595,094 B2  2/2023  Raghavan et al.
2015/0373618 A1*  12/2015  Deenoo ................... H04L 41/12
                                                                  455/502

(Continued)

OTHER PUBLICATIONS

3GPP TR 38.802: "3rd Generation Partnership Project, Technical Specification Group Radio Access Network, Study on New Radio Access Technology Physical Layer Aspects (Release 14)", 3GPP TR 38.802 V14.2.0, 5 Pages, Sep. 2017, Section 6.1.6.1, pp. 15-18.

(Continued)

*Primary Examiner* — Khai Tran
(74) *Attorney, Agent, or Firm* — Holland & Hart LLP/QUALCOMM Incorporated

(57) ABSTRACT

Methods, systems, and devices for wireless communications are described. A first device may transmit, to a second device, an indication of a sequence of beam training phases that are to be used in a requested beam training procedure between the first device and the second device. The sequence of beam training phases may be selected based on interference measurements performed by the first device, various user exposure metrics, device mobility, power consumption, among other metrics. The second device may receive the indication from the first device, and may transmit a response message to the first device that acknowledges the sequence of beam training phases for the requested beam training procedure. Both the first device and the second (Continued)

device may perform the requested beam training procedure by communicating information via one or more communication beams, which may include performing the sequence of beam training phases indicated by the first device.

38 Claims, 20 Drawing Sheets

(58) Field of Classification Search
CPC .............. H04B 7/0617; H04B 7/0482; H04W 41/0668; H04W 72/046; H04W 74/008
USPC ........................................ 375/267, 260, 262
See application file for complete search history.

(56) References Cited

U.S. PATENT DOCUMENTS

| | | |
|---|---|---|
| 2018/0192428 A1 | 7/2018 | Doostnejad et al. |
| 2019/0103908 A1* | 4/2019 | Yu ........................ H04B 7/0617 |
| 2019/0239233 A1 | 8/2019 | Ryu et al. |
| 2020/0162980 A1* | 5/2020 | Kalkunte ............. H04B 7/0617 |
| 2021/0067219 A1 | 3/2021 | Liu et al. |
| 2021/0068077 A1 | 3/2021 | Raghavan et al. |
| 2021/0127381 A1 | 4/2021 | Ryu et al. |
| 2022/0006688 A1 | 1/2022 | Ryu et al. |

OTHER PUBLICATIONS

International Search Report and Written Opinion—PCT/US2022/071945—ISA/EPO—Aug. 8, 2022.

* cited by examiner

BI-DIRECTIONAL BEAM REFINEMENT COORDINATION FOR WIRELESS SYSTEMS

CROSS REFERENCES

The present application is a 371 national stage filing of International PCT Application No. PCT/US2022/071945 by Raghavan et al. entitled "BI-DIRECTIONAL BEAM REFINEMENT COORDINATION FOR WIRELESS SYSTEMS," filed Apr. 27, 2022; and claims priority to U.S. Provisional patent application Ser. No. 17/330,935 by Raghavan et al. entitled "BI-DIRECTIONAL BEAM REFINEMENT COORDINATION FOR WIRELESS SYSTEMS," filed May 26, 2021, each of which is assigned to the assignee hereof, and each of which is expressly incorporated by reference in its entirety herein.

INTRODUCTION

The following relates to wireless communications, and more specifically to beam refinement coordination procedures for wireless systems.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method for wireless communications at a first device in a wireless network is described. In some examples, the method may include transmitting, to a second device in the wireless network, a first indication of a sequence of one or more beam training phases for a beam training procedure between the first device and the second device. In some examples, the method may include receiving, from the second device, a second indication corresponding to the beam training procedure in response to transmitting the first indication. In some examples, the method may include communicating, based on the first and second indications, one or more signals with the second device via one or more communication beams to perform the one or more beam training phases as part of the beam training procedure, the communicating the one or more signals in accordance with the sequence of the one or more beam training phases.

An apparatus for wireless communications at a first device in a wireless network is described. The apparatus may include a processor, memory coupled with the processor, and instructions stored in the memory. In some examples, the instructions may be executable by the processor to cause the apparatus to transmit, to a second device in the wireless network, a first indication of a sequence of one or more beam training phases for a beam training procedure between the first device and the second device. In some examples, the instructions may be executable by the processor to cause the apparatus to receive, from the second device, a second indication corresponding to the beam training procedure in response to transmitting the first indication. In some examples, the instructions may be executable by the processor to cause the apparatus to communicate, based on the first and second indications, one or more signals with the second device via one or more communication beams to perform the one or more beam training phases as part of the beam training procedure, the communicating the one or more signals in accordance with the sequence of the one or more beam training phases.

Another apparatus for wireless communications at a first device in a wireless network is described. In some examples, the apparatus may include means for transmitting, to a second device in the wireless network, a first indication of a sequence of one or more beam training phases for a beam training procedure between the first device and the second device. In some examples, the apparatus may include means for receiving, from the second device, a second indication corresponding to the beam training procedure in response to transmitting the first indication. In some examples, the apparatus may include means for communicating, based on the first and second indications, one or more signals with the second device via one or more communication beams to perform the one or more beam training phases as part of the beam training procedure, the communicating the one or more signals in accordance with the sequence of the one or more beam training phases.

A non-transitory computer-readable medium storing code for wireless communications at a first device in a wireless network is described. In some examples, the code may include instructions executable by a processor to transmit, to a second device in the wireless network, a first indication of a sequence of one or more beam training phases for a beam training procedure between the first device and the second device. In some examples, the code may include instructions executable by the processor to receive, from the second device, a second indication corresponding to the beam training procedure in response to transmitting the first indication. In some examples, the code may include instructions executable by the processor to communicate, based on the first and second indications, one or more signals with the second device via one or more communication beams to perform the one or more beam training phases as part of the beam training procedure, the communicating the one or more signals in accordance with the sequence of the one or more beam training phases.

Some examples of the method, apparatuses, and non-transitory computer-readable medium described herein may further include operations, features, means, or instructions for selecting the one or more beam training phases based on one or more metrics associated with the first device or the second device and performing the one or more beam training phases as part of the beam training procedure based on the selecting.

Some examples of the method, apparatuses, and non-transitory computer-readable medium described herein may further include operations, features, means, or instructions for selecting the one or more beam training phases based on a differential between a first number of antenna elements at the first device and a second number of antenna elements at the second device.

Some examples of the method, apparatuses, and non-transitory computer-readable medium described herein may further include operations, features, means, or instructions for performing the one or more beam training phases of the beam training procedure at the first device based on the first number of antenna elements being greater than the second number of antenna elements.

In some examples of the method, apparatuses, and non-transitory computer-readable medium described herein, the one or more metrics may include a first power consumption metric associated with the first device and a second power consumption metric associated with the second device. In some examples, the method, apparatuses, and non-transitory computer-readable medium may include further operations, features, means, or instructions for selecting a number of symbols for performing the one or more beam training phases based on a differential between the first power consumption metric associated with the first device and the second power consumption metric associated with the second device.

In some examples of the method, apparatuses, and non-transitory computer-readable medium described herein, the one or more metrics may include a first thermal metric associated with the first device and a second thermal metric associated with the second device. In some examples, the method, apparatuses, and non-transitory computer-readable medium may include further operations, features, means, or instructions for selecting a number of symbols for performing the one or more beam training phases based on a differential between the first thermal metric associated with the first device and the second thermal metric associated with the second device.

In some examples of the method, apparatuses, and non-transitory computer-readable medium described herein, the one or more metrics may include a first maximum permissible exposure (MPE) metric associated with the first device and a second MPE metric associated with the second device. In some examples, the method, apparatuses, and non-transitory computer-readable medium may include further operations, features, means, or instructions for selecting the one or more beam training phases based on the first MPE metric, the second MPE metric, or both.

In some examples of the method, apparatuses, and non-transitory computer-readable medium described herein, the one or more metrics including a first mobility state associated with the first device and a second mobility state associated with the second device. In some examples, the method, apparatuses, and non-transitory computer-readable medium may include further operations, features, means, or instructions for receiving, from the second device, an indication of the second mobility state associated with the second device and selecting the one or more beam training phases based on the first mobility state and the second mobility state.

Some examples of the method, apparatuses, and non-transitory computer-readable medium described herein may further include operations, features, means, or instructions for selecting the one or more beam training phases based on the first mobility state corresponding to a lower mobility relative to the second mobility state.

Some examples of the method, apparatuses, and non-transitory computer-readable medium described herein may further include operations, features, means, or instructions for transmitting, to the second device, an indication of the first mobility state associated with the first device.

Some examples of the method, apparatuses, and non-transitory computer-readable medium described herein may further include operations, features, means, or instructions for selecting the one or more beam training phases as part of the beam training procedure based on the first type of blockage and the second type of blockage.

Some examples of the method, apparatuses, and non-transitory computer-readable medium described herein may further include operations, features, means, or instructions for selecting the one or more beam training phases based on a number of antenna elements associated with the first device, the second device, or both, a power consumption differential between the first device and the second device, a thermal differential between the first device and the second device, one or more MPE metrics, a type of blockage for the first device, the second device, or both, a mobility state for the first device, the second device, or both, or any combination thereof.

In some examples of the method, apparatuses, and non-transitory computer-readable medium described herein, the second indication includes an acknowledgement of the one or more beam training phases, one or more additional beam training phases to be performed by the second device, a modification of the beam training procedure, or any combination thereof.

In some examples of the method, apparatuses, and non-transitory computer-readable medium described herein, the beam training procedure including a partial beam training procedure and the method, apparatuses, and non-transitory computer-readable medium may include further operations, features, means, or instructions for selecting the one or more beam training phases in accordance with a first subset of a total number of antenna elements of the first device, a second subset of a total number of antenna elements of the second device, or both.

In some examples of the method, apparatuses, and non-transitory computer-readable medium described herein, the beam training procedure including a partial beam training procedure and the method, apparatuses, and non-transitory computer-readable medium may include further operations, features, means, or instructions for selecting the one or more beam training phases in accordance with a first subset of a total number of resources allocated for transmissions of the one or more signals by the first device, a second subset of a total number of resources allocated for transmissions of the one or more signals by the second device, or both.

In some examples of the method, apparatuses, and non-transitory computer-readable medium described herein, the communicating may include operations, features, means, or instructions for transmitting, to the second device, the one or more signals via the one or more communication beams based on the beam training procedure and in accordance with the sequence of the one or more beam training phases.

In some examples of the method, apparatuses, and non-transitory computer-readable medium described herein, the communicating may include operations, features, means, or instructions for receiving, from the second device, the one or more signals via the one or more communication beams based on the beam training procedure and in accordance with the sequence of the one or more beam training phases.

Some examples of the method, apparatuses, and non-transitory computer-readable medium described herein may further include operations, features, means, or instructions for selecting a set of antenna element resources or a set of reference signal resources for performing the one or more beam training phases of the beam training procedure, where the communicating the one or more signals may be based on the set of antenna element resources or the set of reference signal resources.

In some examples of the method, apparatuses, and non-transitory computer-readable medium described herein, the one or more beam training phases include a first beam training phase corresponding to a wide beam selection phase, a second beam training phase corresponding to a first beam refinement phase at the first device, and a third beam training phase corresponding to a second beam refinement phase at the second device.

In some examples of the method, apparatuses, and non-transitory computer-readable medium described herein, the sequence of the one or more beam training phases indicates a device order of performing the one or more beam training phases at the first device, the second device, or both.

A method for wireless communications at a second device in a wireless network is described. In some examples, the method may include receiving, from a first device in the wireless network, a first indication of a sequence of one or more beam training phases for a beam training procedure between the second device and the first device. In some examples, the method may include transmitting, to the first device, a second indication corresponding to the beam training procedure in response to receiving the first indication. In some examples, the method may include communicating, based on the first and second indications, one or more signals with the first device via one or more communication beams to perform the one or more beam training phases as part of the beam training procedure, the communicating the one or more signals in accordance with the sequence of the one or more beam training phases.

An apparatus for wireless communications at a second device in a wireless network is described. The apparatus may include a processor, memory coupled with the processor, and instructions stored in the memory. In some examples, the instructions may be executable by the processor to cause the apparatus to receive, from a first device in the wireless network, a first indication of a sequence of one or more beam training phases for a beam training procedure between the second device and the first device. In some examples, the instructions may be executable by the processor to cause the apparatus to transmit, to the first device, a second indication corresponding to the beam training procedure in response to receiving the first indication. In some examples, the instructions may be executable by the processor to cause the apparatus to communicate, based on the first and second indications, one or more signals with the first device via one or more communication beams to perform the one or more beam training phases as part of the beam training procedure, the communicating the one or more signals in accordance with the sequence of the one or more beam training phases.

Another apparatus for wireless communications at a second device in a wireless network is described. In some examples, the apparatus may include means for receiving, from a first device in the wireless network, a first indication of a sequence of one or more beam training phases for a beam training procedure between the second device and the first device. In some examples, the apparatus may include means for transmitting, to the first device, a second indication corresponding to the beam training procedure in response to receiving the first indication. In some examples, the apparatus may include means for communicating, based on the first and second indications, one or more signals with the first device via one or more communication beams to perform the one or more beam training phases as part of the beam training procedure, the communicating the one or more signals in accordance with the sequence of the one or more beam training phases.

A non-transitory computer-readable medium storing code for wireless communications at a second device in a wireless network is described. In some examples, the code may include instructions executable by a processor to receive, from a first device in the wireless network, a first indication of a sequence of one or more beam training phases for a beam training procedure between the second device and the first device. In some examples, the code may include instructions executable by the processor to transmit, to the first device, a second indication corresponding to the beam training procedure in response to receiving the first indication. In some examples, the code may include instructions executable by the processor to communicate, based on the first and second indications, one or more signals with the first device via one or more communication beams to perform the one or more beam training phases as part of the beam training procedure, the communicating the one or more signals in accordance with the sequence of the one or more beam training phases.

Some examples of the method, apparatuses, and non-transitory computer-readable medium described herein may further include operations, features, means, or instructions for performing the one or more beam training phases as part of the beam training procedure based on one or more metrics associated with the second device or the first device.

In some examples of the method, apparatuses, and non-transitory computer-readable medium described herein, the one or more metrics corresponding to a differential between a first number of antenna elements associated with the first device and a second number of antenna elements associated with the second device.

In some examples of the method, apparatuses, and non-transitory computer-readable medium described herein, the one or more beam training phases of the beam training procedure performed at the first device based on the first number of antenna elements being greater than the second number of antenna elements.

In some examples of the method, apparatuses, and non-transitory computer-readable medium described herein, the one or more metrics may include a first power consumption metric associated with the first device and a second power consumption metric associated with the second device. In some examples, a number of symbols allocated for the one or more beam training phases may be based on a differential between the first power consumption metric associated with the first device and the second power consumption metric associated with the second device.

In some examples of the method, apparatuses, and non-transitory computer-readable medium described herein, the one or more metrics including a first thermal metric associated with the first device and a second thermal metric associated with the second device. In some examples, a number of symbols allocated for the one or more beam training phases may be based on a differential between the first thermal metric associated with the first device and the second thermal metric associated with the second device.

In some examples of the method, apparatuses, and non-transitory computer-readable medium described herein, the one or more beam training phases based on the one or more metrics including a first MPE metric associated with the first device and a second MPE metric associated with the second device.

In some examples of the method, apparatuses, and non-transitory computer-readable medium described herein, the one or more metrics may include a first mobility state associated with the first device and a second mobility state associated with the second device. In some examples, the method, apparatuses, and non-transitory computer-readable medium may include further operations, features, means, or instructions for transmitting, to the first device, an indication of the second mobility state associated with the second device, the one or more beam training phases based on the first mobility state and the second mobility state.

Some examples of the method, apparatuses, and non-transitory computer-readable medium described herein may further include operations, features, means, or instructions for receiving, from the first device, an indication of the first mobility state associated with the first device.

In some examples of the method, apparatuses, and non-transitory computer-readable medium described herein, the one or more beam training phases based on the one or more metrics including a first type of blockage associated with the first device and a second type of blockage associated with the second device.

In some examples of the method, apparatuses, and non-transitory computer-readable medium described herein, the one or more beam training phases based on a number of antenna elements may be associated with the first device, the second device, or both, a power consumption differential between the first device and the second device, a thermal differential between the first device and the second device, one or more MPE metrics, a type of blockage for the first device, the second device, or both, a mobility state for the first device, the second device, or both, or any combination thereof.

In some examples of the method, apparatuses, and non-transitory computer-readable medium described herein, the second indication includes an acknowledgement of the one or more beam training phases, one or more additional beam training phases to be performed by the second device, a modification of the beam training procedure, or any combination thereof.

In some examples of the method, apparatuses, and non-transitory computer-readable medium described herein, the beam training procedure including a partial beam training procedure, the one or more beam training phases associated with a first subset of a total number of antenna elements of the first device, a second subset of a total number of antenna elements of the second device, or both.

In some examples of the method, apparatuses, and non-transitory computer-readable medium described herein, the beam training procedure including a partial beam training procedure, the one or more beam training phases associated with a first subset of a total number of resources allocated for transmissions of the one or more signals by the first device, a second subset of a total number of resources allocated for transmissions of the one or more signals by the second device, or both.

Some examples of the method, apparatuses, and non-transitory computer-readable medium described herein may further include operations, features, means, or instructions for receiving, from the first device, the one or more signals via the one or more communication beams based on the beam training procedure and in accordance with the sequence of the one or more beam training phases.

Some examples of the method, apparatuses, and non-transitory computer-readable medium described herein may further include operations, features, means, or instructions for transmitting, to the first device, the one or more signals via the one or more communication beams based on the beam training procedure and in accordance with the sequence of the one or more beam training phases.

In some examples of the method, apparatuses, and non-transitory computer-readable medium described herein, the one or more beam training phases of the beam training procedure performed using a set of antenna element resources or a set of reference signal resources.

In some examples of the method, apparatuses, and non-transitory computer-readable medium described herein, the one or more beam training phases may include a first beam training phase corresponding to a wide beam selection phase, a second beam training phase corresponding to a first beam refinement phase at the first device, and a third beam training phase corresponding to a second beam refinement phase at the second device.

In some examples of the method, apparatuses, and non-transitory computer-readable medium described herein, the sequence of the one or more beam training phases indicates a device order of performing the one or more beam training phases at the first device, the second device, or both.

DETAILED DESCRIPTION

Figure 1:
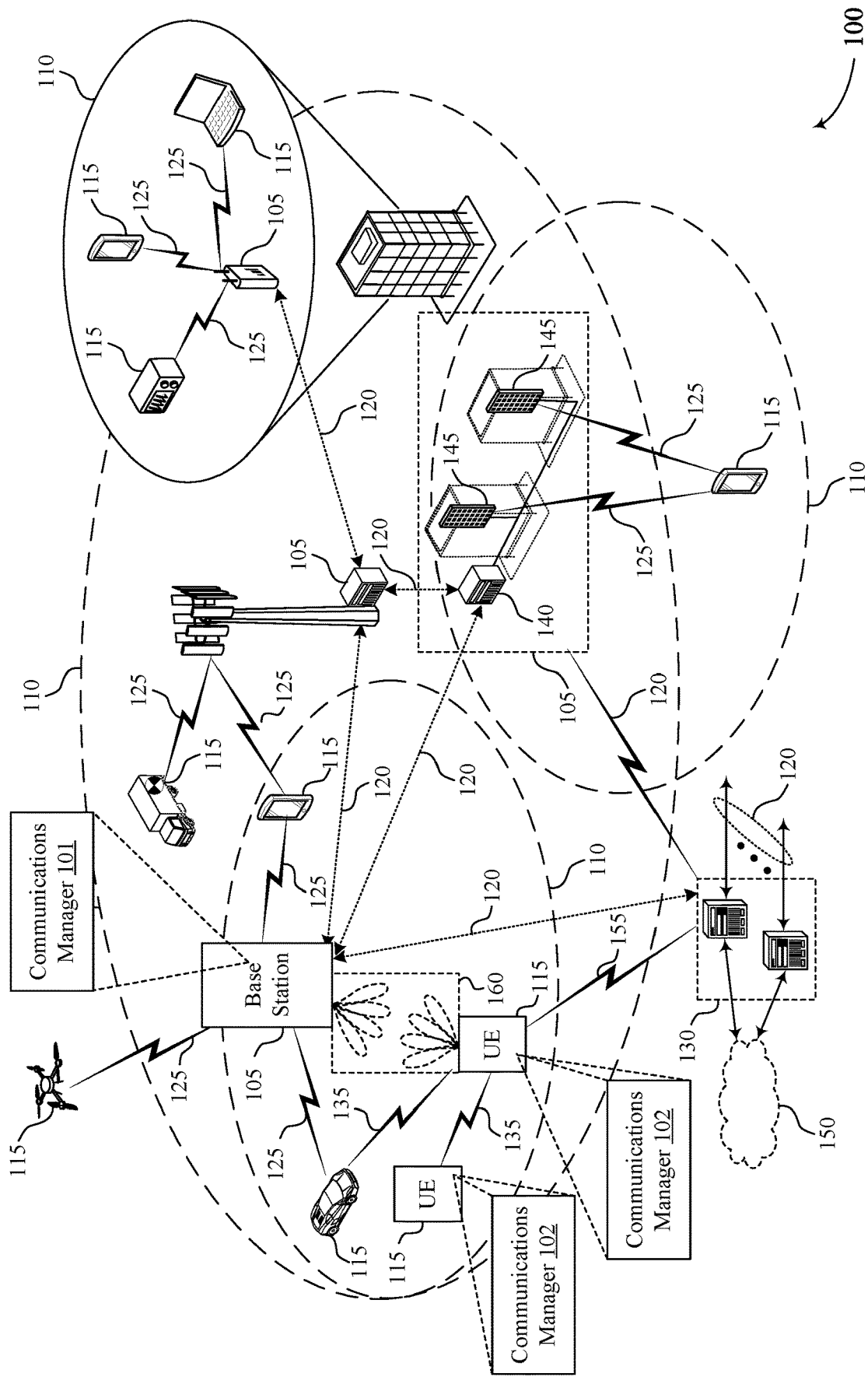
FIGS. 1-3 illustrate an examples of wireless communications systems that support bi-directional beam refinement coordination for wireless systems in accordance with one or more aspects of the present disclosure.

In some wireless communications systems, wireless devices may perform beam training procedures to select and refine one or more beams at both transmitting and receiving ends of a communication link, including an uplink and a downlink, between the wireless devices. Hierarchical beam training on the downlink, for example, may be performed using a sequential P1-P2-P3 procedure, where a first phase (P1) may include coarse beam sweeping and selection between transmitting and receiving devices, a second phase (P2) may include beam refinement at the transmitting device (e.g., by a base station or sidelink UE), and a third phase (P3) may include beam refinement procedures at the receiving device (e.g., by a receiving UE). However, such beam refinement procedures may be implementation-based, and to increase the effectiveness and efficiency of such beam refinement procedures, the UE may instead determine to implement coordinated beam refinement procedures.

In accordance with examples as disclosed herein, transmitting and receiving wireless devices may dynamically coordinate beam refinement at one or both of a transmitting end and a receiving end of a wireless communication link. For example, the devices may coordinate to perform different beam refinement procedures based on differential metrics or constraints at the nodes. For example, devices may implement different sequences of beam refinement processes of a beam training procedure (e.g., P2, P3, P2-P3 in that order, P3-P2 in that order) based on factors or differentials (e.g., in terms of hardware properties, capabilities, or the like) associated with the devices in the communication link.

In a first example, the beam refinement procedure may be determined based on an evaluation of the number of antenna elements at each of the devices, where the device with the greatest number of antenna elements performs the beam refinement. In a second example, the number of symbols allocated for beam refinement may be determined based on power consumption or thermal differentials between the devices, or both. In some other examples, the beam refinement procedure may be determined based on MPE metrics or constraints for one or both devices, mobility between devices, measurements or processes capturing or including blockages or other interference characteristics, or any combination thereof. A first device such as a base station or a UE may evaluate one or more metrics to determine a desired beam refinement procedure, and the device may signal an indication of the determined beam refinement procedure to a second device. The second device may signal an indication back to the first device, which may include an acknowledgement message for the desired beam refinement procedure. Both devices may perform a beam training procedure in accordance with the determined beam refinement procedure. By effectively coordinating beam refinement according to the techniques described herein, wireless devices may perform more efficient beam training, which may increase power savings, reduce signal-to-interference and noise ratio (SINR), and account for changing network conditions.

Aspects of the disclosure are initially described in the context of wireless communications systems. Aspects of the disclosure are further illustrated by and described with reference to a process flow, apparatus diagrams, system diagrams, and flowcharts that relate to bi-directional beam refinement coordination for wireless systems.

FIG. 1 illustrates an example of a wireless communications system 100 that supports bi-directional beam refinement coordination for wireless systems in accordance with one or more aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. A UE 115 may communicate with the core network 130 through a communication link 155.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IOT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or DFT-S-OFDM). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell may cover a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrow band IoT (NB-IOT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrow band communications), or a combination of these techniques. For example, some UEs 115 may be configured for operation using a narrow band protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). In some examples, the D2D communication link 135 may be or may include a sidelink. One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, in some cases, in the range of 300 MHz to 300 gigahertz (GHz). In some cases, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below: 300 MHZ.

The electromagnetic spectrum is often subdivided, based on frequency/wavelength, into various classes, bands, channels, etc. In 5G NR two initial operating bands have been identified as frequency range designations FR1 (410 MHZ-7.125 GHZ) and FR2 (24.25 GHZ-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHZ. For example, three higher operating bands have been identified as frequency range designations FR4a or FR4-1 (52.6 GHZ-71 GHZ), FR4 (52.6 GHZ-114.25 GHZ), and FR5 (114.25 GHZ-300 GHz). Each of these higher frequency bands falls within the EHF band.

With the above aspects in mind, unless specifically stated otherwise, it should be understood that the term "sub-6 GHZ" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The wireless communications system 100 may also operate in a super high frequency (SHF) region using frequency bands from 3 GHz to 30 GHZ, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHZ industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming 160. The antennas of a base station 105 or a UE 115 may be located within one or more antenna arrays or antenna panels, which may support MIMO operations or transmit or receive beamforming 160. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming 160 for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming 160, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming 160 may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some examples, wireless communications system 100 may implement beamforming in a MIMO context, where an optimal beamforming vector at a transmitting device may be a dominant right singular vector of a channel and an optimal beamforming vector at a receiving device may be a dominant left singular vector of the channel or a different channel (e.g., a matched filter for optimal beamforming at the transmitting device).

To effectively maximize a vector $|g^H H f|^2$, $f_{opt} = v_1(H^H H)$ and $g_{opt} = Hf_{opt}/\|Hf_{opt}\| = u_1(H^H H)$ where $\|.\|$ denotes a two-norm operation, $H = UAV^H$ with $u_1(.)$ and $v_1(.)$ being unit-norm first columns of U and V and with diagonal entries of A arranged in decreasing order. Accordingly, $u_1(.)$ and $v_1(.)$ are the dominant left and right singular vectors of H.

In such cases, even if $f_{opt}$ may not be used at the transmitting device, the optimal beamforming vector at the receiving device is still the matched filter $Hf/\|Hf\|$, whichever f may be used at the transmitting device.

A base station 105 or a UE 115 may use beam sweeping techniques as part of beamforming operations 160. For example, a base station 105 may use multiple antennas or antenna arrays (e.g., antenna panels) to conduct beamforming operations 160 for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency (RF) or analog beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a channel state information reference signal (CSI-RS), a sounding reference signal (SRS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest SINR, or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to increase link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may increase throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

One or more of the operations performed by a base station 105 may be performed by a base station communications manager 101, which may be an example of a communications manager 420, 520, 620, 720, 820, 920, 1020, or 1120, as described with reference to FIGS. 4 through 11.

One or more of the operations performed by a UE 115 may be performed by a UE communications manager 102, which may be an example of a communications manager 420, 520, 620, 720, 820, 920, 1020, or 1120, as described with reference to FIGS. 4 through 11.

Wireless communications system 100 may support various beam training procedures to select and refine one or more beams at both transmitting and receiving ends of a communication link (e.g., backhaul link 120, communication link 125, 135, or 155) between the wireless devices, which may include one or more of a base station 105 or a UE 115. For example, a sequential P1-P2-P3 procedure may be implemented, which includes coarse beam selection and subsequent beam refinement at both transmitting and receiving ends of the communication link. Such beam refinement procedures, however, may be implementation-based individually at each device and may in some cases be uncoordinated between devices performing the beam training.

To increase the efficiency and efficacy of such beam training procedures, transmitting and receiving wireless devices (e.g., such as UE 115 and base station 105) may dynamically coordinate beam refinement at both transmitting and receiving ends of a wireless communication link based on differential metrics or constraints at the nodes. For example, devices may implement different sequences of beam refinement processes of a beam training procedure (e.g., P2, P3, P2-P3 in that order, P3-P2 in that order) based on factors or differentials determined for devices in the communication link. Some such factors or differentials may include the number of antenna modules or panels at each of the devices, number of antenna elements (e.g., within a panel) at each of the devices, power consumption or thermal differentials between the devices, MPE metrics or constraints for both devices, mobility between devices, measurements or processes capturing or including blockage metrics or constraints, or any combination thereof. A first device may evaluate one or more metrics to determine a desired beam refinement procedure, and the device may signal an indication of the determined beam refinement procedure to a second device to coordinate beam training.

Figure 2:
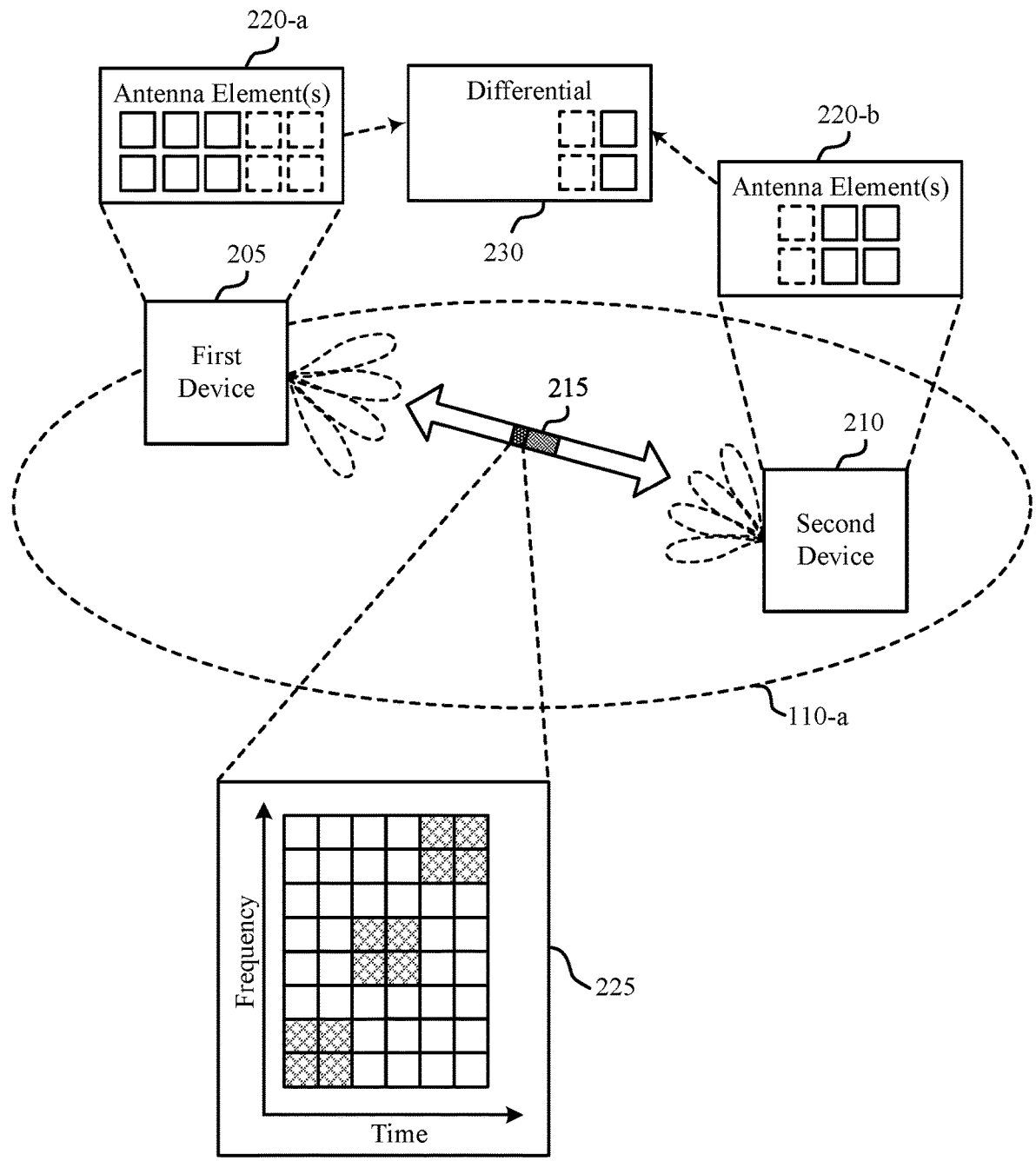

FIG. 2 illustrates an example of a wireless communications system 200 that supports bi-directional beam refinement coordination for wireless systems in accordance with one or more aspects of the present disclosure. In some examples, wireless communications system 200 may include aspects of wireless communications system 100. For example, wireless communications system 200 may include a first device 205 and a second device 210, which each may be examples of any device as described with reference to FIG. 1. For example, the first device 205, the second device 210, or both, may be an example or examples of UEs 115, base stations 105, high-power UEs (HPUEs), IAB nodes, eNBs, gNBs, or the like. In some examples, the terms "UE" or "base station" may refer to any such devices.

In some wireless communications systems (e.g., mmW systems, or the like), first device 205 and second device 210 (e.g., a base station, a UE, or the like) may perform a beam training procedure for selection of one or more beams and subsequent communication using the one or more beams. For example, the first device 205 may initiate a beam training procedure using one or more antenna elements 220-a according to a first fixed analog beamforming codebook or predefined beam directions stored at the first device 205 (e.g., stored in a radio frequency integrated circuit (RFIC) memory device at the first device 205, or other device circuitry), and the second device 210 may initiate or follow a different or the same beam training procedure using one or more antenna elements 220-b according to a second fixed analog beamforming codebook (e.g., predefined beam directions) stored at the second device 210, which may be the same or different from the first fixed codebook. In some examples, the use of the first and second fixed analog beamforming codebooks may increase available memory at the devices and may reduce beamforming complexity by selection between a set of beams of a known codebook. Such a beam training procedure may involve beamforming from the one or more antenna elements 220 at the first device 205, second device 210, or both.

Beamforming may bridge a link budget for the first device 205 and second device 210, that is, beamforming may facilitate successful communication using one or more beams selected such as to reduce power losses and signal attenuation between devices. A beam training procedure may include coarse beam selection and beam refinement, which may include selecting one or more wide or coarse beams and narrowing the beamwidth of one or more coarse beams for communication. Some beam training procedures, however, may result in higher signaling performance (e.g., higher SINR values) than other beam training procedures.

Some beam training procedures may operate according to a defined procedure that may include one or more phases or sub-procedures. For example, a transmitting wireless device, a receiving wireless device (e.g., a first node and a second node of a link), or both, may initiate a hierarchical beam training procedure such as a P1-P2-P3 procedure. P1 may include coarse beam sweeping and selection between (e.g., at) transmitting and receiving devices, P2 may include beam refinement at the transmitting device (e.g., a base station or sidelink UE), and P3 may include beam refinement procedures at the receiving device (e.g., by a receiving UE).

A base station and a UE may perform a P1 procedure to select a coarse beam direction for communication. Upon completion of P1, the base station may initiate P2, and may perform a beam refinement procedure by transmitting a number of narrow beams in the direction of the selected coarse beam. The base station may perform the P2 beam refinement procedure based on a reference signal received power (RSRP) feedback for link quality with a CSI-RS for beam management. The base station may also indicate one or more CSI-RS symbols to the UE for a P3 procedure. For example, the base station may receive feedback from the UE as to which narrow beam the UE selects as being the highest quality (e.g., greatest RSRP). In some examples, the base station may be able to trigger P3 with or without UE feedback. Upon completion of P2, the UE may initiate a P3 procedure, and may perform a beam refinement procedure (e.g., in response to the beam refinement procedure P2 of the base station or in response to a trigger from the base station). For example, the base station may repeatedly transmit the beam selected in P2 such that the UE may determine a receive beam to use to receive the P2 beam. In some examples, the UE may be able to perform P3 beam refinement without indicating the performance of the P3 beam refinement to the base station.

The transmitting device and receiving wireless device may operate P1, P2, and P3 according to one or more analog beamforming codebooks stored at each device. However, in some wireless communications systems (e.g., symmetric settings such as with IAB nodes, sidelink communications, and the like), transmitting and receiving wireless devices may be able to selectively decrease power consumption, increase beamforming performance, achieve high SINR, or otherwise increase the efficacy of beam training procedures by dynamically coordinating or modifying a beam training procedure (e.g., the P1-P2-P3 procedure, or any combination of P1, P2, and P3) between devices.

In some wireless communications systems, relative performance of beamforming and communication using one or more beams may be compared to an optimal beamforming vector. For example, in MIMO communication systems, an optimal beamforming vector at a transmitting wireless device may be associated with the dominant right singular vector of a channel, and an optimal beamforming vector at a receiving wireless device may be associated with the dominant left singular vector of a channel, which may be a matched filter to the optimal beamforming vector at the transmitting wireless device. In some examples, increased beamforming performance may be associated with performance metrics approaching performance metrics associated with the dominant right singular vector, the dominant left singular vector, or both.

Increased beamforming performance (e.g., low SINR values) may be associated with a greater number of devices implementing beam refinement (e.g., both a transmitting device and a receiving device implementing P2-P3). That is, beam refinement at both the transmitting and receiving devices (e.g., P2-P3 based) may result in increased beamforming performance (e.g., higher data rates) compared to beam refinement at the receiving device (e.g., P3 based), or at the transmitting device (e.g., P2 based), and may also result in increased beamforming performance compared to a baseline performance using baseline beams based on a P1 beam sweep at both the transmitting device and receiving device. In some examples, P2 beam refinement may be based on an addition of some narrow beamwidth beams (e.g., selected narrow beams). In some examples, P3 beam refinement may be based on a per-antenna co-phasing technique, which may facilitate an increased beamforming performance. In some cases, the P2-P3 based beam refinement may result in a 1-2 decibels (dB) increase (e.g., for SINR), or any other dB increase, compared to the P3 based beam refinement or the baseline P1 beam sweep. In accordance with examples as disclosed herein, the wireless communications system 200 may support bi-directional beam refinement coordination to dynamically modify a beam training procedure to increase beamforming performance by considering various metrics or, in some examples, constraints, at a transmitting device, a receiving device, or both.

In some examples, a first device 205 and a second device 210 may dynamically coordinate beam refinement procedures at the first device 205, the second device 210, or both, according to one or more metrics or, in some examples, constraints, associated with one or both of first device 205 and second device 210. For example, one or both of first device 205 and second device 210 may perform a beam refinement procedure (e.g., which may be the same as or similar to P2, P3, or both) as a part of a beam training procedure based on one or more metrics including a number of antenna elements 220 or other RFIC architecture characteristics, power consumption capabilities or metrics, thermal conditions or metrics (e.g., thermal output metrics, a thermal output differential, or the like), or any combination thereof. Additionally or alternatively, one or both of first device 205 and second device 210 may perform a beam refinement procedure based on MPE metrics or, in some examples, constraints, signal blockage types, metrics, or, in some examples, constraints, mobility characteristics, metrics, or states (e.g., a high-speed train (HST) state, a low mobility state, a stationary state, or other mobility states), or any combination thereof.

In some cases, any one or more of the aforementioned metrics or constraints, or any other metrics or constraints associated with the beam training, may be time-varying (e.g., the use or implementation of the one or more metrics or constraints may change with time). Depending on the metrics or constraints, one or both of first device 205 and second device 210 may perform beam refinement according to procedures the same as or similar to P2, P3, P2-P3, or P3-P2. In some examples, one or both of first device 205 and second device 210 may perform beam refinement with a reduced set of antenna elements 220 (e.g., a subset of the total set of antenna elements), a reduced set of reference signal (RS) resources, or both.

In examples where first device 205 is a base station, or any similar device, and second device 210 is a UE, or any similar device, (e.g., a base station 105 and a UE 115, respectively), first device 205 may access or include a greater number of antenna elements 220 than second device 210. Thus, first device 205 may perform beam refinement (e.g., as a part of P2, P2-P3, or P3-P2) to increase beamforming performance (e.g., higher SINR values, peak array gain or spectral efficiency, link improvement, and the like). Further, if second device 210 is a UE, second device 210 may have less power expenditure capabilities relative to first device 205 (e.g., based on finite battery power), higher susceptibility to overheating (e.g., based on a thermal output metric at second device 210), or other issues, and may be associated with relatively fewer symbols or time-frequency resources 225, which may include the symbols, allocated for beam refinement for second device 210 compared to first device 205, which may have higher power expenditure capabilities, lower susceptibility to overheating (e.g., based on a thermal output metric at first device 205), or the like.

As described herein, the term differential, which may refer to a difference in antenna element number (e.g., differential 230), a thermal differential, power differential, or any other differential, may refer to a difference in thermal energy output or generation metrics (e.g., units of energy, power, temperature, or the like), power consumption metrics (e.g., related units such as units of voltage, current, power, or the like), respectively. A calculated or determined differential (e.g., by subtracting or comparing a first metric at first device 205 from or to a second metric at second device 210, or vice versa) may determine or be used to determine (e.g., along with other metrics under consideration) a sequence (e.g., P2, P3, P2-P3 in that order, or P3-P2 in that order) for a beam refinement procedure at one or both of first device 205 and second device 210.

For example, if first device 205 is associated with a first power consumption capability metric greater than a second power consumption capability metric associated with second device 210, one or both of first device 205 and second device 210 may determine to select a beam training procedure that includes beam refinement at least at first device 205, or to allocate more beam refinement symbols or time-frequency resources 225, which may include the symbols, at first device 205. That is, performing beam refinement, or performing beam refinement with a greater number of symbols or time-frequency resources 225 allocated for beam refinement, may be associated with higher power consumption. Thus, devices with higher power consumption capability metrics, rather than devices with lower power consumption capability metrics (e.g., according to a power consumption capability differential), may be selected to perform beam refinement or perform beam refinement with a greater number of symbols or time-frequency resources 225 allocated for beam refinement. Thus, in some examples, first device 205 may perform a P2 beam refinement procedure to mitigate adverse power, temperature, or other effects of performing beam refinement at second device 210. In such examples, first device 205 may be an HPUE, an IAB node, a gNB, an eNB, or the like (e.g., any device with a greater number of antenna elements 220, greater power expenditure capabilities, lower susceptibility to overheating, or the like, compared to second device 210, which may be a UE).

In some other examples, MPE metrics or, in some examples, constraints, in some communications systems (e.g., in sidelinks) may determine which of first device 205, second device 210, or both, may perform beam refinement (e.g., according to procedures the same as or similar to P2, P3, P2-P3, or P3-P2). For example, in cases where second device 210 is a UE, second device 210 may be associated with an MPE restriction, which may limit a signal strength or power for transmission. Thus, for example, if second device 210 is associated with a relatively low MPE limit, first device 205 may perform the P2 beam refinement procedure to decrease the likelihood that the signal power during a beam refinement procedure at the second device 210 may approach, reach, or exceed the MPE limit for the second device 210.

In some other examples, in cases where first device 205 is a base station, or any similar device, and second device 210 is a mobile UE, or any similar device, first device 205 may be associated with increased beamforming performance gain compared due to the limited mobility of first device 205. Performing beam refinement at first device 205 may result in first device 205 being able to use the resulting refined beams for a longer time period due to the limited mobility of first device 205. Thus, first device 205 may perform beam refinement according to the P2, P2-P3, or P3-P2 beam refinement procedures.

Based on the aforementioned metrics or constraints, first device 205 and second device 210 may dynamically coordinate beam refinement procedures via one or more signals 215. For example, first device 205 may determine a desired beam refinement sequence (e.g., an order of beam training phases) such as P2, P3, P2-P3, or P3-P2 based on one or more metrics or constraints (e.g., associated with first device 205) as discussed herein. First device 205 may transmit signaling to second device 210 indicating the desired sequence of one or more beam refinement procedures. Such signaling, or other signaling, may include an indication of one or more of the one or more metrics or constraints that the first device 205 uses to determine the desired beam refinement sequence.

Second device 210 may determine a desired beam refinement sequence (e.g., a desired order), which may be the same as or different from the desired beam refinement sequence by first device 205, based on one or more metrics or constraints (e.g., associated with second device 210). Second device 210 may transmit one or more signal(s) 215 to first device 205 indicating the desired beam refinement sequence of second device 210. Such signaling, or other signaling, may include one or more of the one or metrics or constraints (e.g., associated with first device 205, second device 210, or both).

Additionally or alternatively, such signaling may include an acknowledgement of some or all of a beam training procedure (e.g., the beam refinement procedure). In some cases, the signaling may include a request to modify the beam training procedure, for example, by adding or removing additional beam training phases such as P1, P2, P3, or any combination thereof, or an ordering of beam training phases of the beam training procedure. First device 205 may select a beam training procedure (e.g., including a beam refinement procedure), an indication of a number of symbols or resources (e.g., one or more time-frequency resources 225, which may include one or more symbols) for performing some or all of a beam training procedure (e.g., the beam refinement procedure), or both. First device 205 may select the beam training procedure, number of symbols, or both, according to the determined metrics or constraints for first device 205, received metrics from second device 210, or both, and may signal an indication of one or more aspects of the beam training procedure to the second device 210.

In some cases, first device 205 and second device 210 may indicate respective metrics or constraints to each other before, during, or after dynamically coordinating the beam refinement procedure. First device 205 and second device 210 may communicate one or more signals 215 to each other according to the selected beam training procedure. For example, if the selected beam training procedure includes a selected beam refinement procedure that is the same as or similar to P2-P3, first device 205 may perform beam refinement according to P2, or a similar procedure, and second device 210 may perform beam refinement according to P3, or a similar procedure, concurrently with, or after P2.

In some examples, first device 205 and second device 210 may perform a partial beam training procedure (e.g., due to or based on a constrained or reduced set of antenna elements 220 at one or both of the first device 205 and the second device 210). In such examples, the one or both of the first device 205 and second device 210 may implement a reduced set of RS resources (e.g., a portion of time/frequency resources 225). The partial beam training procedure may include one or more of the aspects of the beam training procedure as described herein.

Figure 3:
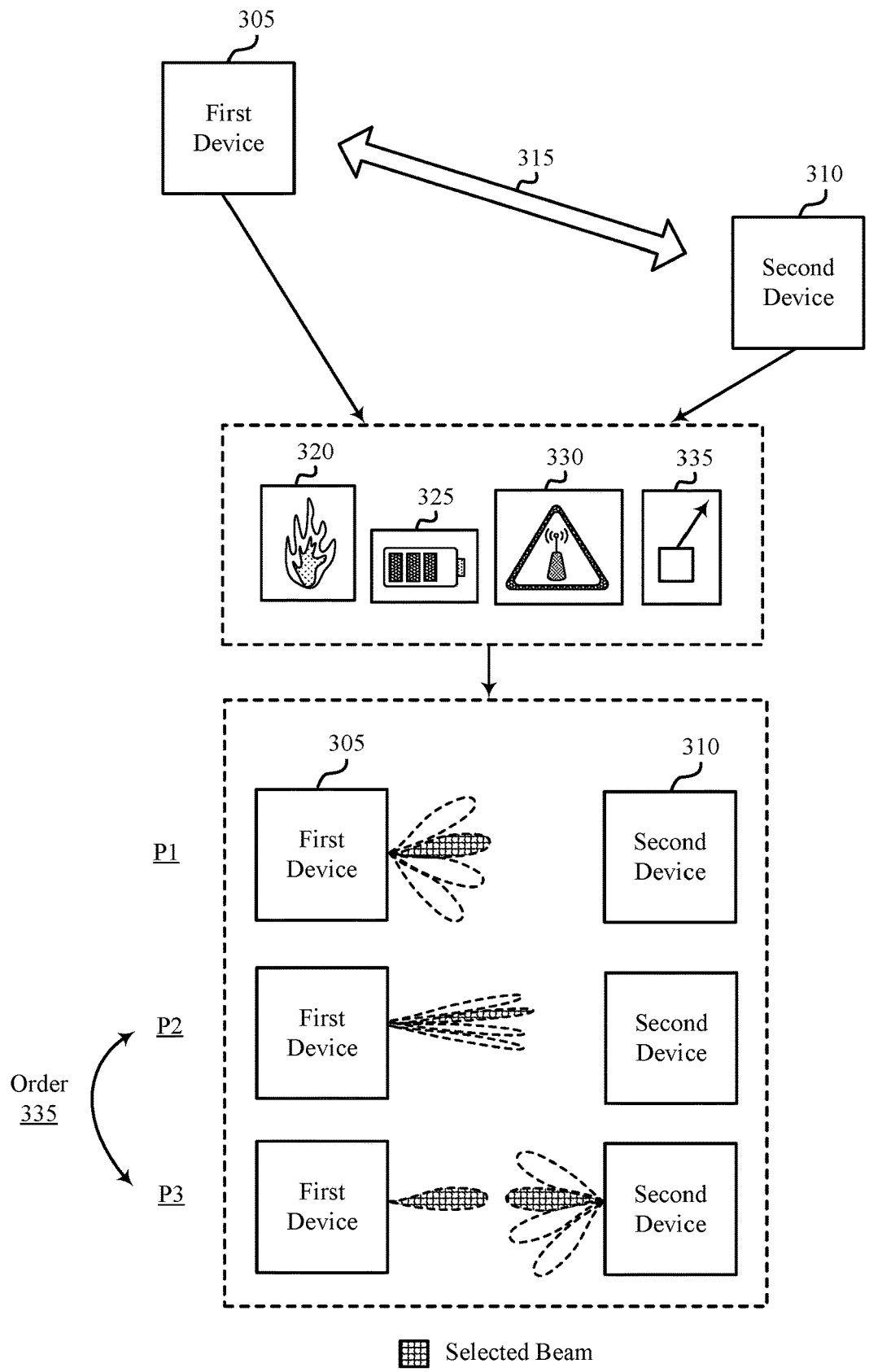

FIG. 3 illustrates an example of a wireless communications system 300 that supports bi-directional beam refinement coordination for wireless systems in accordance with one or more aspects of the present disclosure. In some examples, wireless communications system 300 may include aspects of wireless communications system 100. For example, wireless communications system 300 may include a first device 305 and a second device 310, which each may be examples of any device as described with reference to FIG. 1. For example, the first device 305, the second device 310, or both, may be an example or examples of UEs 115, base stations 105, high-power UEs (HPUEs), IAB nodes, eNBs, gNBs, or the like. In some examples, the terms "UE" or "base station" may refer to any such devices.

The first device 305 and the second device 310 may communicate via communication link 315 which may be established using the various beamforming techniques described herein based on one or more differentials in communication or device-specific metrics associated with the first device 305, the second device 310, or both. With reference to FIGS. 1 and 2, the term differential may refer to a difference in thermal output 320, a difference in power 325, a MPE differential 330, a mobility metric differential 335, or any combination thereof. A calculated or determined differential (e.g., by subtracting or comparing a first metric at first device 305 from or to a second metric at second device 310, or vice versa) may determine or be used to determine an order 335 (e.g., P2, P3, P2-P3 in that order, or P3-P2 in that order) for a beam refinement procedure at one or both of first device 305 and second device 310. The beam refinement may be used to select transmit and receive beams for communication between the first device 305 and the second device 310.

For example, if first device 305 is associated with a first thermal output metric and the second device 310 is associated with a second thermal output metric. The first device 305, the second device 310, or both, may select a beam refinement procedure (e.g., an order or beam refinement, a number of time/frequency resources, or beam refinement at the first device 305, the second device 310, or both) based on a differential 320 between the first thermal output metric and the second power output metric.

In some examples, a first device 305 is associated with a first power consumption metric and the second device 310 may be associated with a second power consumption metric. The first device 305, the second device 310, or both, may select a beam refinement procedure (e.g., an order or beam refinement, a number of time/frequency resources, or beam refinement at the first device 305, the second device 310, or both) based on a differential 325 between the first power consumption metric and the second power consumption metric.

In some examples, the first device 305 may be associated with a first MPE and the second device 310 is associated with a second MPE. The first device 305, the second device 310, or both, may select a beam refinement procedure (e.g., an order or beam refinement, a number of time/frequency resources, or beam refinement at the first device 305, the second device 310, or both) based on a differential 330 between the first MPE and the second MPE.

In some examples, the first device 305 may be associated with a first mobility state (e.g., movement of the first device 305, speed of the device, or movement of the first device 305 relative to the second device 310) and the second device 310 is associated with a second mobility state (e.g., movement of the second device 310, speed of the device, or movement of the second device 310 relative to the first device 305). The first device 305, the second device 310, or both, may select a beam refinement procedure (e.g., an order or beam refinement, a number of time/frequency resources, or beam refinement at the first device 305, the second device 310, or both) based on a differential 335 between the first mobility metric and the second mobility metric.

Figure 4:
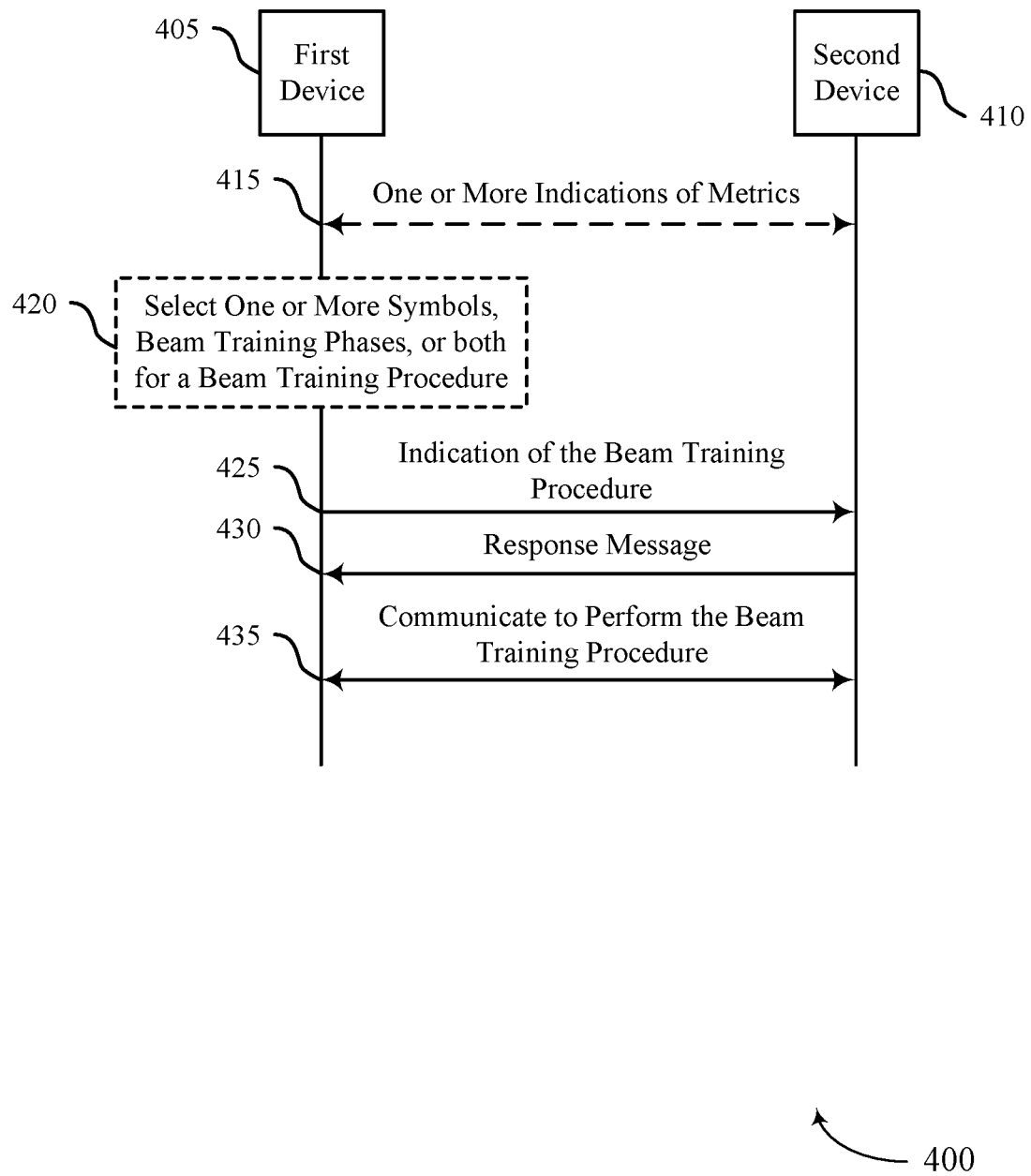
FIG. 4 illustrates an example of a process flow that supports bi-directional beam refinement coordination for wireless systems in accordance with one or more aspects of the present disclosure.

FIG. 4 illustrates an example of a process flow 400 that supports bi-directional beam refinement coordination for wireless systems in accordance with one or more aspects of the present disclosure. The process flow 400 may implement aspects of the wireless communications systems 100, 200, or 300, as described with reference to FIGS. 1-3. In the following description of the process flow 400, the operations between first device 405 and second device 410 may be performed in different orders or at different times. Some operations may also be omitted from the process flow 400, and other operations may be added to the process flow 400.

At 415, first device 405 and second device 410 may communicate one or more indications of metrics. In some examples, the one or more metrics may include a first number of antenna elements associated with the first device 405 and a second number of antenna elements associated with the second device 410, a first power consumption metric associated with the first device 405 and a second power consumption metric associated with the second device 410, a first thermal output metric associated with the first device 405 and a second thermal output metric associated with the second device 410, a first MPE metric associated with the first device 405 and a second MPE metric associated with the second device 410, a first mobility state associated with the first device 405 and a second mobility state associated with the second device 410, a first signal blockage type associated with the first device 405 and a second signal blockage type associated with the second device 410, or any combination thereof.

At 420, first device 405 may select one or more symbols (e.g., one or more time-frequency resources, which may include the one or more symbols), beam training phases, or both, for a beam training procedure. In some examples, first device 405 may select the one or more beam training phases based on one or more metrics associated with the first device 405 or the second device 410. In some examples, first device 405 may select the one or more beam training phases based on a differential between a first number of antenna elements and a second number of antenna elements. The first device 405 may select the one or more beam training phases based on the first MPE metric, the second MPE metric, or both. In some examples, the first device 405 may select the one or more beam training phases based on the first mobility state and the second mobility state. For example, the first device 405 may select the one or more beam training phases based on the first mobility state corresponding to a lower mobility relative to the second mobility state. In some examples, the first device 405 may select the one or more beam training phases as part of the beam training procedure based on the first signal blockage type and the second signal blockage type.

In some cases, first device 405 may select a number of symbols for performing the one or more beam training phases based on a differential between the first power consumption metric associated with the first device 405 and the second power consumption metric associated with the second device 410, select a number of symbols for performing the one or more beam training phases based on a differential between the first thermal output metric associated with the first device 405 and the second thermal output metric associated with the second device 410, or any combination thereof.

At 425, first device 405 may transmit, to second device 410 in the wireless network, a first indication of a sequence of one or more beam training phases for a beam training procedure between the first device 405 and the second device 410. In some examples, the indication may include an indication of any or multiple of the one or more metrics as described at 415. In some examples, the sequence of the one or more beam training phases indicates a device order of performing the one or more beam training phases at the first device 405, the second device 410, or both.

At 430, second device 410 may transmit, to first device 405, a second indication corresponding to the beam training procedure in response to receiving the first indication from first device 405. In some examples, the indication may include an indication of any or multiple of the one or more metrics as described at 415. In some examples, the second indication may include an acknowledgment of the one or more beam training phases, one or more additional beam training phases to be performed by the second device 410, a modification of the beam training procedure, or any combination thereof.

At 435, first device 405 and second device 410 may communicate, based on the first and second indications, one or more signals with the second device 410 via one or more communication beams to perform the one or more beam training phases as part of the beam training procedure, the communicating the one or more signals in accordance with the sequence of the one or more beam training phases. In some examples, first device 405 may perform the one or more beam training phases of the beam training procedure at the first device 405 based on the first number of antenna elements being greater than the second number of antenna elements. In some examples, the beam training procedure may include a partial beam training procedure.

In some examples, the communication between first device 405 and second device 410 may include transmitting, to the second device 410, the one or more signals via the one or more beams based on the beam training procedure and in accordance with the sequence of the one or more beam training phases, receiving, from the second device 410, the one or more signals via the one or more communication beams based on the beam training procedure and in accordance with the sequence of the one or more beam training phases, or both. In some examples, prior to, during, or after the communicating, first device 405 may select a set of antenna element resources or a set of reference signal resources for performing the one or more beam training phases of the beam training procedure, where the communicating the one or more signals is based on the set of antenna element resources or the set of reference signal resources.

Figure 5:
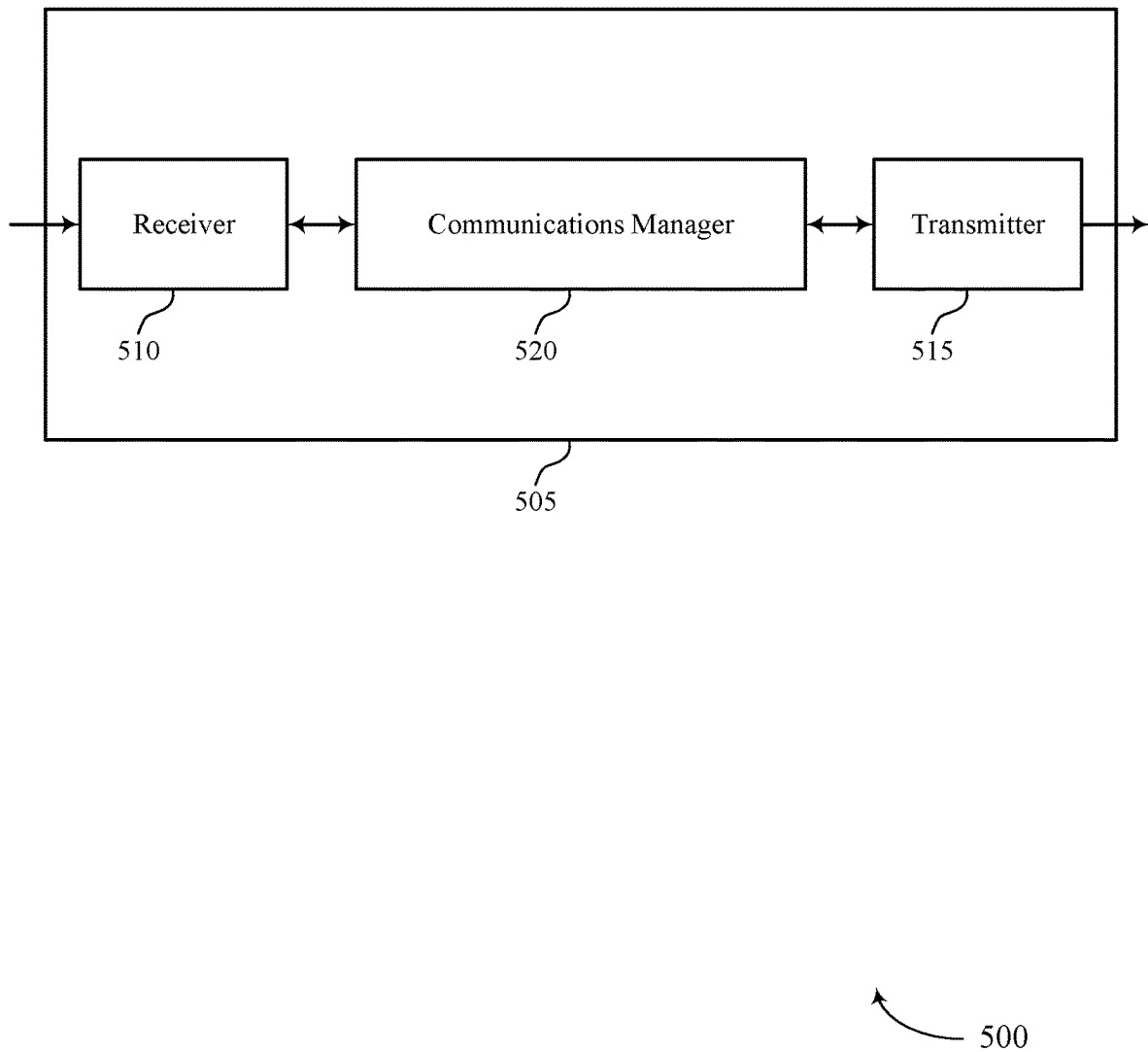
FIGS. 5 and 6 show block diagrams of devices that support bi-directional beam refinement coordination for wireless systems in accordance with one or more aspects of the present disclosure.

FIG. 5 shows a block diagram 500 of a device 505 that supports bi-directional beam refinement coordination for wireless systems in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to bi-directional beam refinement coordination for wireless systems. Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to bi-directional beam refinement coordination for wireless systems). In some examples, the transmitter 515 may be co-located with a receiver 510 in a transceiver module. The transmitter 515 may utilize a single antenna or a set of multiple antenna elements.

The communications manager 520, the receiver 510, the transmitter 515, or various combinations thereof or various components thereof may be examples of means for performing various aspects of bi-directional beam refinement coordination for wireless systems as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a first device in a wireless network in accordance with examples as disclosed herein. For example, the communications manager 520 may be configured as or otherwise support a means for transmitting, to a second device in the wireless network, a first indication of a sequence of one or more beam training phases for a beam training procedure between the first device and the second device. The communications manager 520 may be configured as or otherwise support a means for receiving, from the second device, a second indication corresponding to the beam training procedure in response to transmitting the first indication. The communications manager 520 may be configured as or otherwise support a means for communicating, based on the first and second indications, one or more signals with the second device via one or more communication beams to perform the one or more beam training phases as part of the beam training procedure, the communicating the one or more signals in accordance with the sequence of the one or more beam training phases.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced processing, reduced power consumption, more efficient utilization of communication resources, and increased inter-device coordination.

Figure 6:
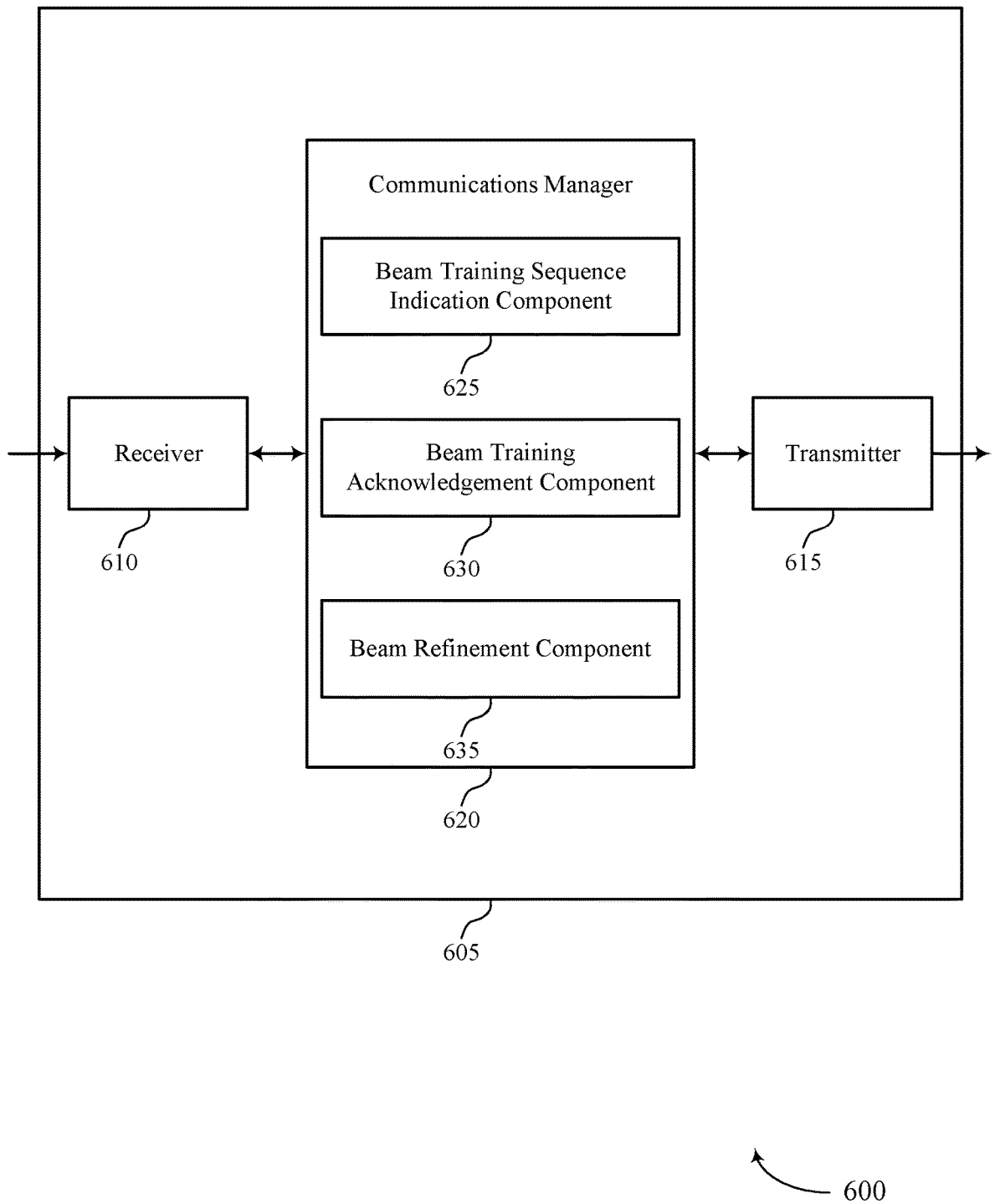

FIG. 6 shows a block diagram 600 of a device 605 that supports bi-directional beam refinement coordination for wireless systems in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to bi-directional beam refinement coordination for wireless systems). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to bi-directional beam refinement coordination for wireless systems). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of bi-directional beam refinement coordination for wireless systems as described herein. For example, the communications manager 620 may include a beam training sequence indication component 625, a beam training acknowledgement component 630, a beam refinement component 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a first device in a wireless network in accordance with examples as disclosed herein. The beam training sequence indication component 625 may be configured as or otherwise support a means for transmitting, to a second device in the wireless network, a first indication of a sequence of one or more beam training phases for a beam training procedure between the first device and the second device. The beam training acknowledgement component 630 may be configured as or otherwise support a means for receiving, from the second device, a second indication corresponding to the beam training procedure in response to transmitting the first indication. The beam refinement component 635 may be configured as or otherwise support a means for communicating, based on the first and second indications, one or more signals with the second device via one or more communication beams to perform the one or more beam training phases as part of the beam training procedure, the communicating the one or more signals in accordance with the sequence of the one or more beam training phases.

Figure 7:
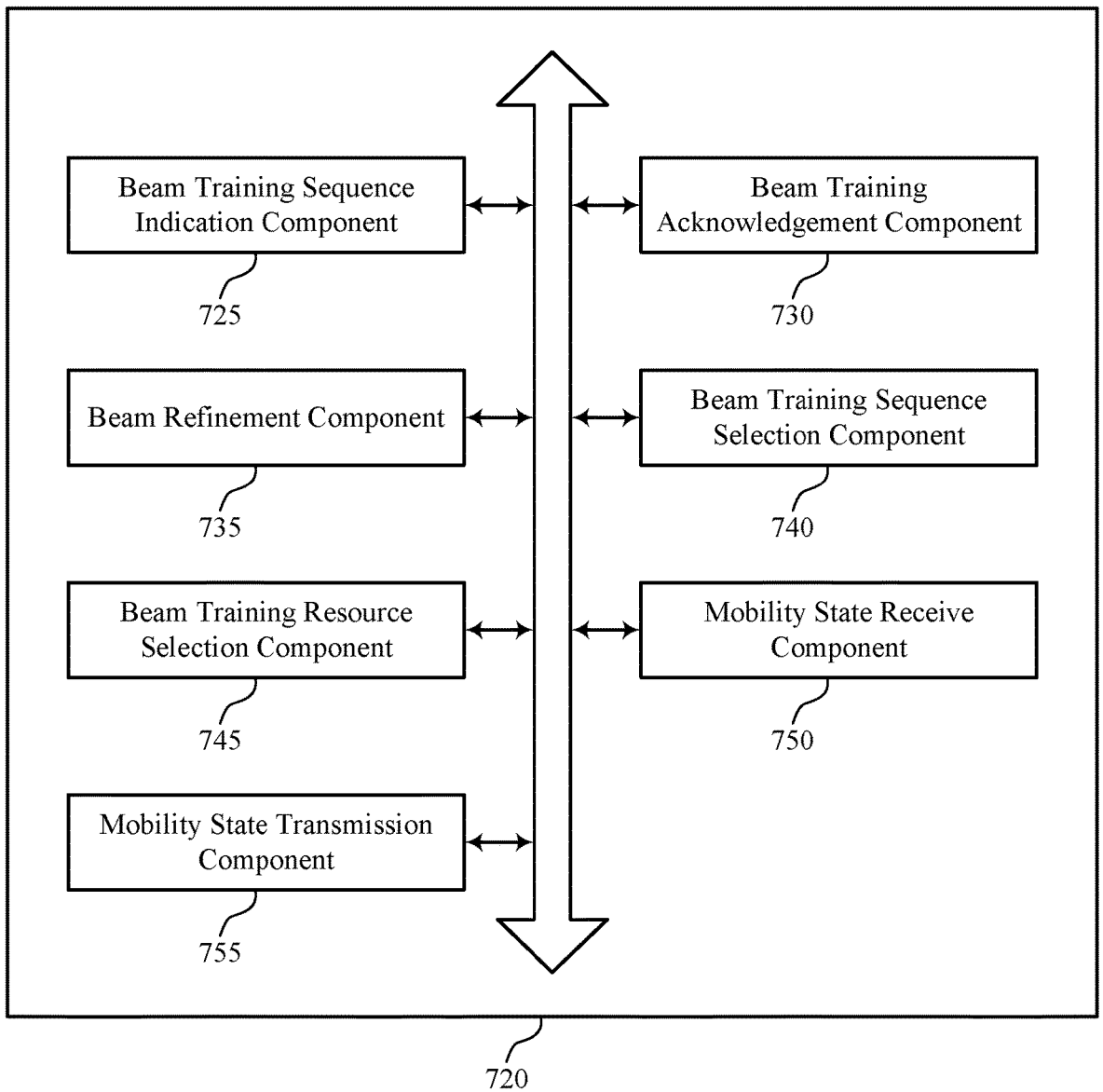
FIG. 7 shows a block diagram of a communications manager that supports bi-directional beam refinement coordination for wireless systems in accordance with one or more aspects of the present disclosure.

FIG. 7 shows a block diagram 700 of a communications manager 720 that supports bi-directional beam refinement coordination for wireless systems in accordance with one or more aspects of the present disclosure. The communications manager 720 may be an example of aspects of a communications manager 520, a communications manager 620, or both, as described herein. The communications manager 720, or various components thereof, may be an example of means for performing various aspects of bi-directional beam refinement coordination for wireless systems as described herein. For example, the communications manager 720 may include a beam training sequence indication component 725, a beam training acknowledgement component 730, a beam refinement component 735, a beam training sequence selection component 740, a beam training resource selection component 745, a mobility state receive component 750, a mobility state transmission component 755, or any combination thereof. Each of these components may communicate, directly or indirectly, with one another (e.g., via one or more buses).

The communications manager 720 may support wireless communications at a first device in a wireless network in accordance with examples as disclosed herein. The beam training sequence indication component 725 may be configured as or otherwise support a means for transmitting, to a second device in the wireless network, a first indication of a sequence of one or more beam training phases for a beam training procedure between the first device and the second device. The beam training acknowledgement component 730 may be configured as or otherwise support a means for receiving, from the second device, a second indication corresponding to the beam training procedure in response to transmitting the first indication. The beam refinement component 735 may be configured as or otherwise support a means for communicating, based on the first and second indications, one or more signals with the second device via one or more communication beams to perform the one or more beam training phases as part of the beam training procedure, the communicating the one or more signals in accordance with the sequence of the one or more beam training phases.

In some examples, the beam training sequence selection component 740 may be configured as or otherwise support a means for selecting the one or more beam training phases based on one or more metrics associated with the first device or the second device. In some examples, the beam refinement component 735 may be configured as or otherwise support a means for performing the one or more beam training phases as part of the beam training procedure based on the selecting.

In some examples, selecting the one or more beam training phases based on a differential between a first number of antenna elements and a second number of antenna elements.

In some examples, the beam refinement component 735 may be configured as or otherwise support a means for performing the one or more beam training phases of the beam training procedure at the first device based on the first number of antenna elements being greater than the second number of antenna elements.

In some examples, the one or more metrics including a first power consumption metric associated with the first device and a second power consumption metric associated with the second device, and the beam training resource selection component 745 may be configured as or otherwise support a means for selecting a number of symbols for performing the one or more beam training phases based on a differential between the first power consumption metric associated with the first device and the second power consumption metric associated with the second device.

In some examples, the one or more metrics including a first thermal metric associated with the first device and a second thermal metric associated with the second device, and the beam training resource selection component 745 may be configured as or otherwise support a means for selecting a number of symbols for performing the one or more beam training phases based on a differential between the first thermal metric associated with the first device and the second thermal metric associated with the second device.

In some examples, the one or more metrics including a first MPE metric associated with the first device and a second MPE metric associated with the second device, and the beam training sequence selection component 740 may be configured as or otherwise support a means for selecting the one or more beam training phases based on the first MPE metric, the second MPE metric, or both.

In some examples, the one or more metrics including a first mobility state associated with the first device and a second mobility state associated with the second device, and the mobility state receive component 750 may be configured as or otherwise support a means for receiving, from the second device, an indication of the second mobility state associated with the second device. In some examples, the one or more metrics including a first mobility state associated with the first device and a second mobility state associated with the second device, and the beam training sequence selection component 740 may be configured as or otherwise support a means for selecting the one or more beam training phases based on the first mobility state and the second mobility state.

In some examples, the beam training sequence selection component 740 may be configured as or otherwise support a means for selecting the one or more beam training phases based on the first mobility state corresponding to a lower mobility relative to the second mobility state.

In some examples, the mobility state transmission component 755 may be configured as or otherwise support a means for transmitting, to the second device, an indication of the first mobility state associated with the first device.

In some examples, selecting the one or more beam training phases as part of the beam training procedure based on the first type of blockage and the second type of blockage.

In some examples, the beam training sequence selection component 740 may be configured as or otherwise support a means for selecting the one or more beam training phases based on a number of antenna elements associated with the first device, the second device, or both, a power consumption differential between the first device and the second device, a thermal differential between the first device and the second device, one or more MPE metrics, a type of blockage for the first device, the second device, or both, a mobility state for the first device, the second device, or both, or any combination thereof.

In some examples, the second indication includes an acknowledgement of the one or more beam training phases, one or more additional beam training phases to be performed by the second device, a modification of the beam training procedure, or any combination thereof.

In some examples, the beam training procedure including a partial beam training procedure, and the beam training sequence selection component 740 may be configured as or otherwise support a means for selecting the one or more beam training phases in accordance with a first subset of a total number of antenna elements of the first device, a second subset of a total number of antenna elements of the second device, or both.

In some examples, the beam training procedure including a partial beam training procedure, and the beam training resource selection component 745 may be configured as or otherwise support a means for selecting the one or more beam training phases in accordance with a first subset of a total number of resources allocated for transmissions of the one or more signals by the first device, a second subset of a total number of resources allocated for transmissions of the one or more signals by the second device, or both.

In some examples, to support communicating, the beam refinement component 735 may be configured as or otherwise support a means for transmitting, to the second device, the one or more signals via the one or more communication beams based on the beam training procedure and in accordance with the sequence of the one or more beam training phases.

In some examples, to support communicating, the beam refinement component 735 may be configured as or otherwise support a means for receiving, from the second device, the one or more signals via the one or more communication beams based on the beam training procedure and in accordance with the sequence of the one or more beam training phases.

In some examples, the beam training resource selection component 745 may be configured as or otherwise support a means for selecting a set of antenna element resources or a set of reference signal resources for performing the one or more beam training phases of the beam training procedure, where the communicating the one or more signals is based on the set of antenna element resources or the set of reference signal resources.

In some examples, the one or more beam training phases include a first beam training phase corresponding to a wide beamwidth-based beam selection phase, a second beam training phase corresponding to a first beam refinement phase at the first device, and a third beam training phase corresponding to a second beam refinement phase at the second device.

In some examples, the sequence of the one or more beam training phases indicates a device order of performing the one or more beam training phases at the first device, the second device, or both.

Figure 8:
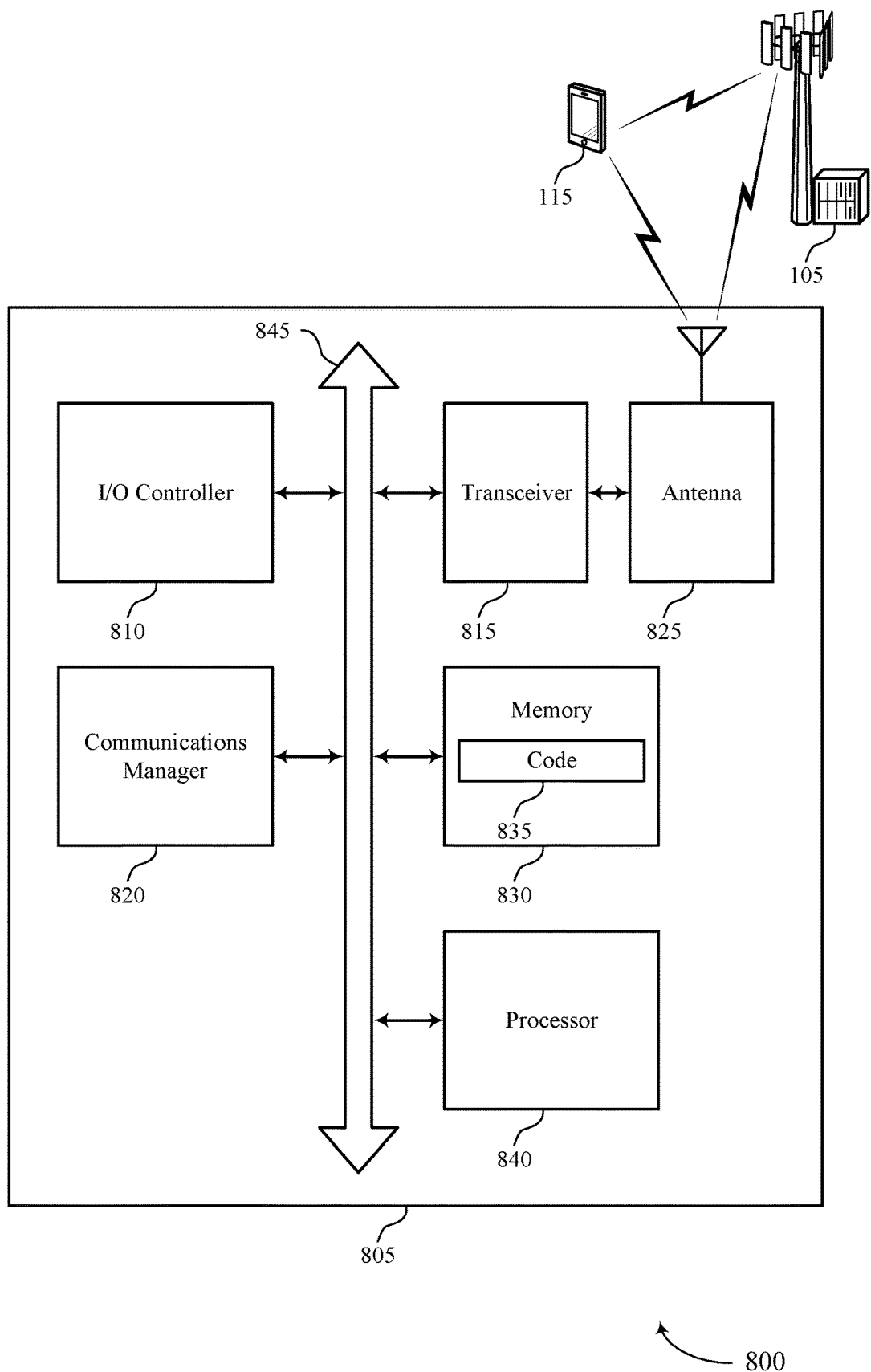
FIG. 8 shows a diagram of a system including a device that supports bi-directional beam refinement coordination for wireless systems in accordance with one or more aspects of the present disclosure.

FIG. 8 shows a diagram of a system 800 including a device 805 that supports bi-directional beam refinement coordination for wireless systems in accordance with one or more aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting bi-directional beam refinement coordination for wireless systems). For example, the device 805 or a component of the device 805 may include a processor 840 and memory 830 coupled to the processor 840, the processor 840 and memory 830 configured to perform various functions described herein.

The communications manager 820 may support wireless communications at a first device in a wireless network in accordance with examples as disclosed herein. For example, the communications manager 820 may be configured as or otherwise support a means for transmitting, to a second device in the wireless network, a first indication of a sequence of one or more beam training phases for a beam training procedure between the first device and the second device. The communications manager 820 may be configured as or otherwise support a means for receiving, from the second device, a second indication corresponding to the beam training procedure in response to transmitting the first indication. The communications manager 820 may be configured as or otherwise support a means for communicating, based on the first and second indications, one or more signals with the second device via one or more communication beams to perform the one or more beam training phases as part of the beam training procedure, the communicating the one or more signals in accordance with the sequence of the one or more beam training phases.

By including or configuring the communications manager 820 in accordance with examples as described herein, the device 805 may support techniques for increased communication reliability, reduced latency, increased user experience related to more reliable signaling, reduced power consumption, more efficient utilization of communication resources, increased coordination between devices, longer battery life, increased utilization of processing capability, among other benefits.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of bi-directional beam refinement coordination for wireless systems as described herein, or the processor 840 and the memory 830 may be otherwise configured to perform or support such operations.

Figure 9:
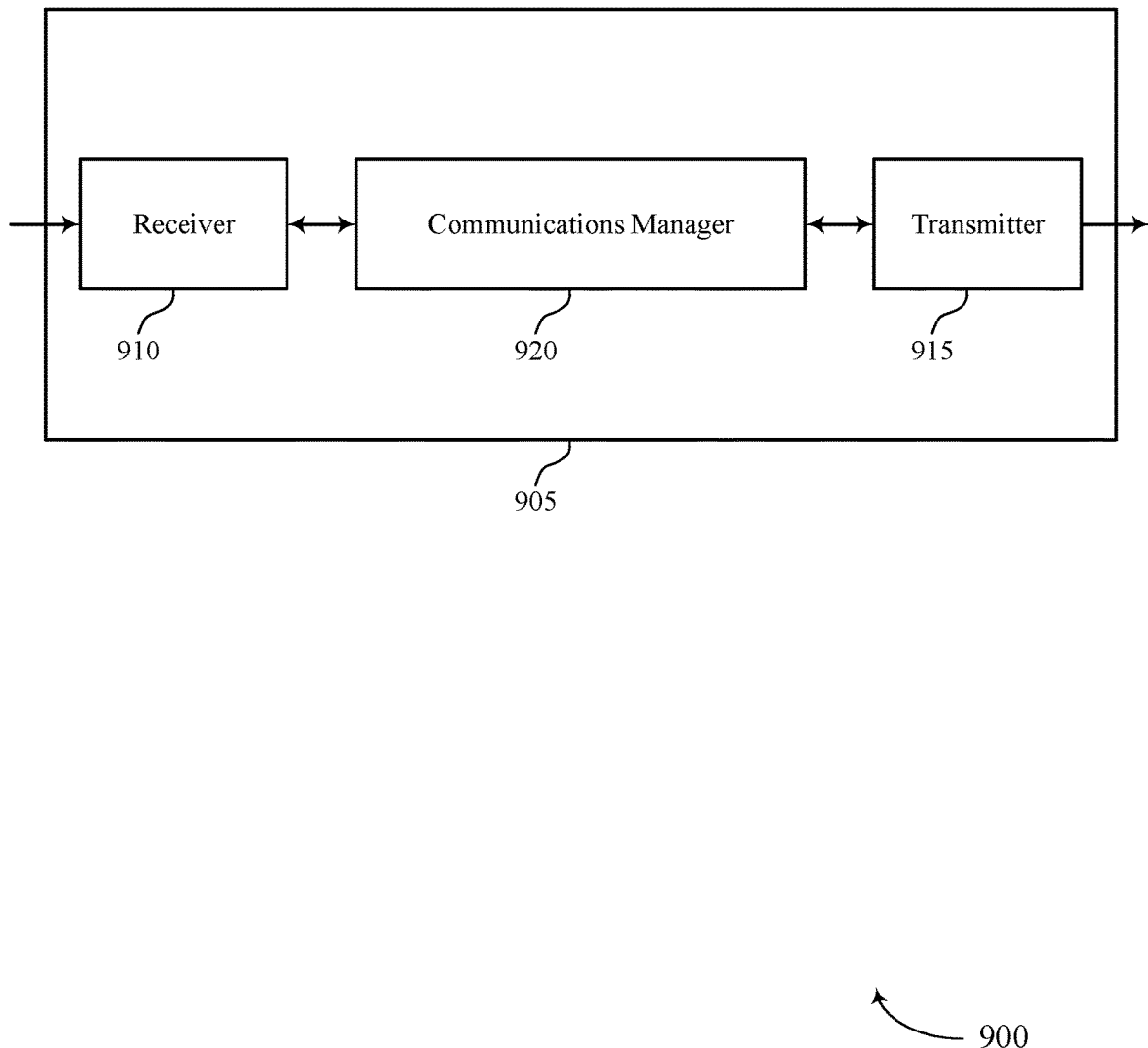
FIGS. 9 and 10 show block diagrams of devices that support bi-directional beam refinement coordination for wireless systems in accordance with one or more aspects of the present disclosure.

FIG. 9 shows a block diagram 900 of a device 905 that supports bi-directional beam refinement coordination for wireless systems in accordance with one or more aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to bi-directional beam refinement coordination for wireless systems). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to bi-directional beam refinement coordination for wireless systems). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of bi-directional beam refinement coordination for wireless systems as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a second device in a wireless network in accordance with examples as disclosed herein. For example, the communications manager 920 may be configured as or otherwise support a means for receiving, from a first device in the wireless network, a first indication of a sequence of one or more beam training phases for a beam training procedure between the second device and the first device.

The communications manager 920 may be configured as or otherwise support a means for transmitting, to the first device, a second indication corresponding to the beam training procedure in response to receiving the first indication. The communications manager 920 may be configured as or otherwise support a means for communicating, based on the first and second indications, one or more signals with the first device via one or more communication beams to perform the one or more beam training phases as part of the beam training procedure, the communicating the one or more signals in accordance with the sequence of the one or more beam training phases.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for reduced processing, reduced power consumption, more efficient utilization of communication resources, and increased inter-device coordination.

Figure 10:
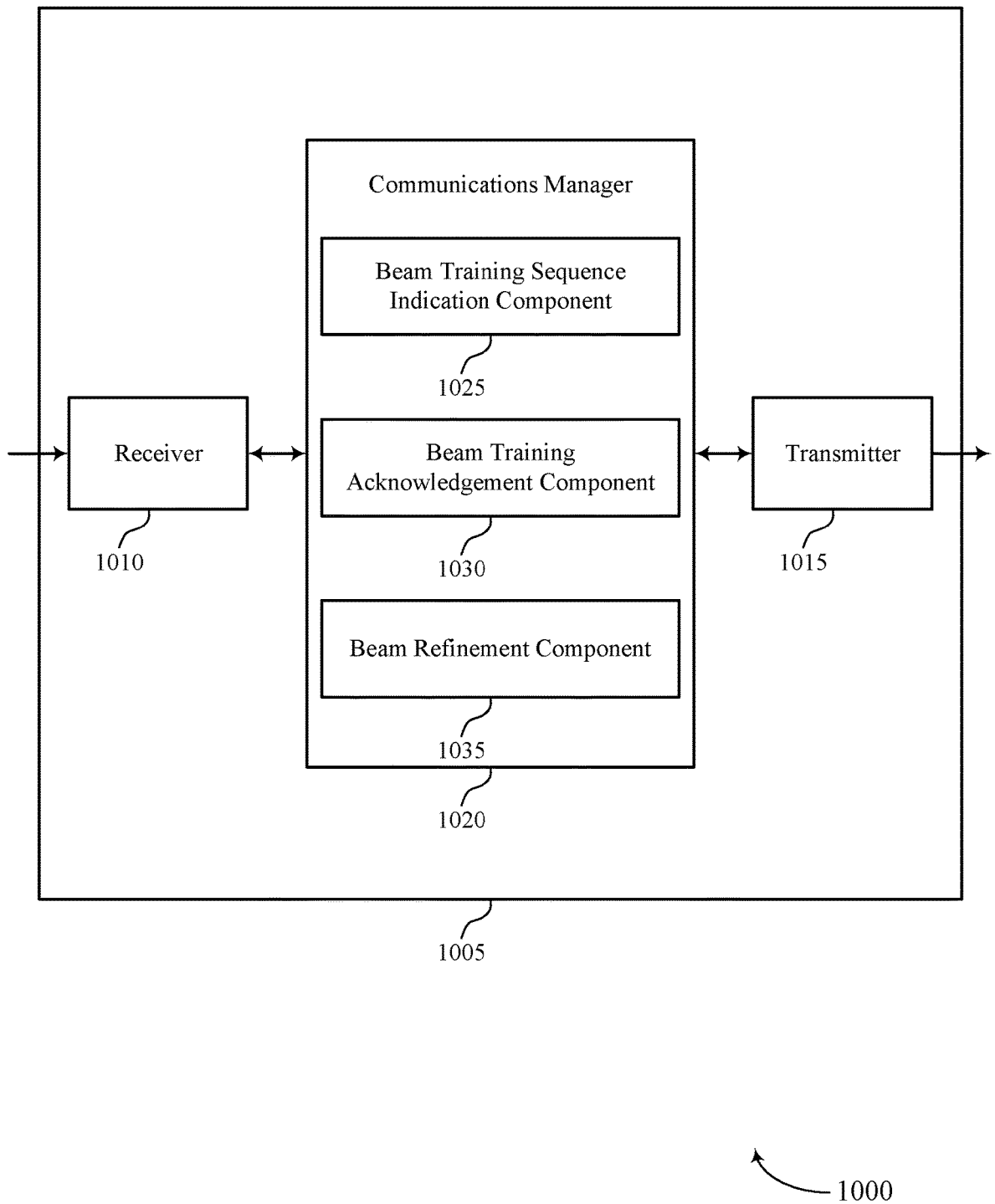

FIG. 10 shows a block diagram 1000 of a device 1005 that supports bi-directional beam refinement coordination for wireless systems in accordance with one or more aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to bi-directional beam refinement coordination for wireless systems). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to bi-directional beam refinement coordination for wireless systems). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of bi-directional beam refinement coordination for wireless systems as described herein. For example, the communications manager 1020 may include a beam training sequence indication component 1025, a beam training acknowledgement component 1030, a beam refinement component 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a second device in a wireless network in accordance with examples as disclosed herein. The beam training sequence indication component 1025 may be configured as or otherwise support a means for receiving, from a first device in the wireless network, a first indication of a sequence of one or more beam training phases for a beam training procedure between the second device and the first device. The beam training acknowledgement component 1030 may be configured as or otherwise support a means for transmitting, to the first device, a second indication corresponding to the beam training procedure in response to receiving the first indication. The beam refinement component 1035 may be configured as or otherwise support a means for communicating, based on the first and second indications, one or more signals with the first device via one or more communication beams to perform the one or more beam training phases as part of the beam training procedure, the communicating the one or more signals in accordance with the sequence of the one or more beam training phases.

Figure 11:
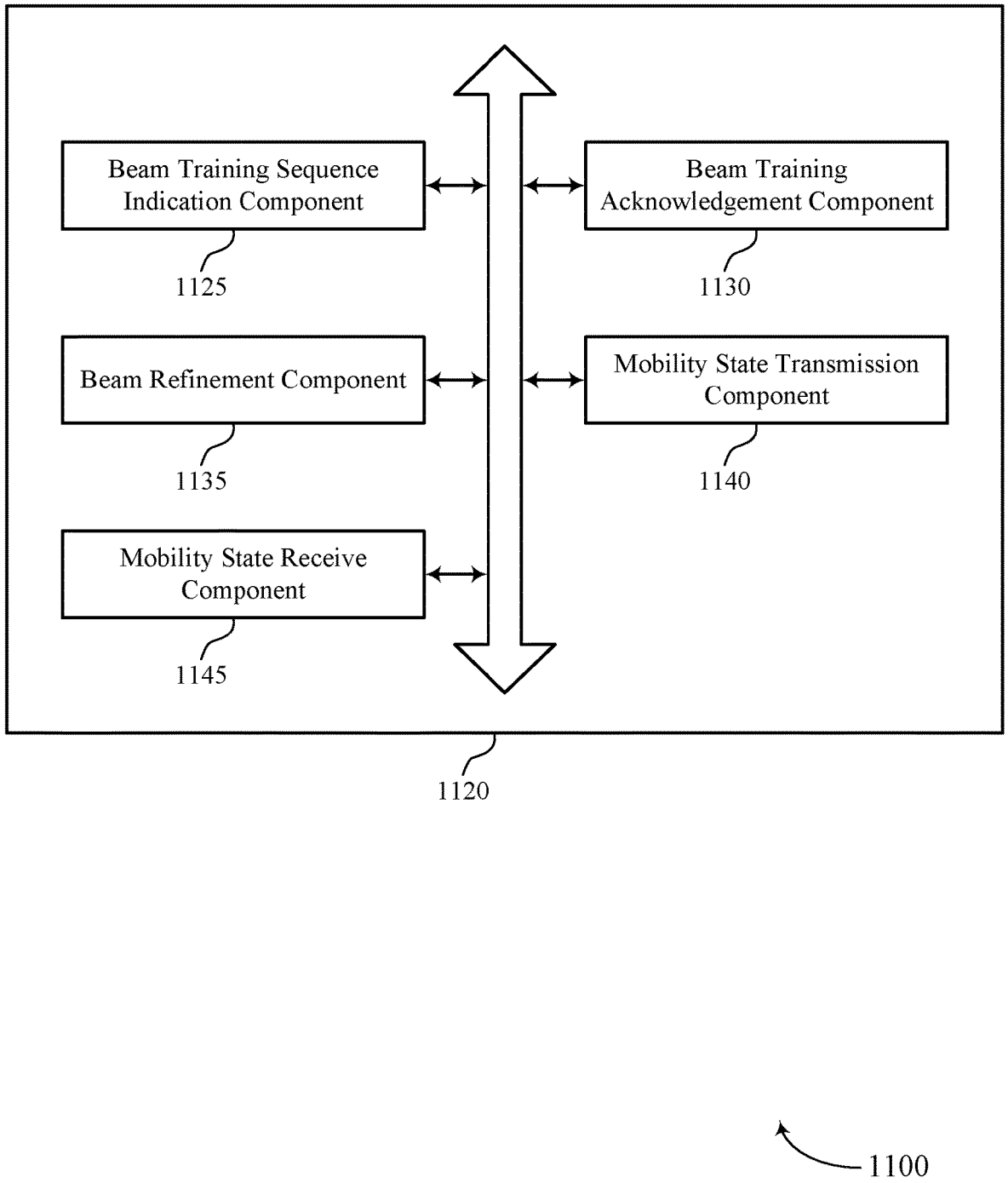
FIG. 11 shows a block diagram of a communications manager that supports bi-directional beam refinement coordination for wireless systems in accordance with one or more aspects of the present disclosure.

FIG. 11 shows a block diagram 1100 of a communications manager 1120 that supports bi-directional beam refinement coordination for wireless systems in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of bi-directional beam refinement coordination for wireless systems as described herein. For example, the communications manager 1120 may include a beam training sequence indication component 1125, a beam training acknowledgement component 1130, a beam refinement component 1135, a mobility state transmission component 1140, a mobility state receive component 1145, or any combination thereof. Each of these components may communicate, directly or indirectly, with one another (e.g., via one or more buses).

The communications manager 1120 may support wireless communications at a second device in a wireless network in accordance with examples as disclosed herein. The beam training sequence indication component 1125 may be configured as or otherwise support a means for receiving, from a first device in the wireless network, a first indication of a sequence of one or more beam training phases for a beam training procedure between the second device and the first device. The beam training acknowledgement component 1130 may be configured as or otherwise support a means for transmitting, to the first device, a second indication corresponding to the beam training procedure in response to receiving the first indication. The beam refinement component 1135 may be configured as or otherwise support a means for communicating, based on the first and second indications, one or more signals with the first device via one or more communication beams to perform the one or more beam training phases as part of the beam training procedure, the communicating the one or more signals in accordance with the sequence of the one or more beam training phases.

In some examples, the beam refinement component 1135 may be configured as or otherwise support a means for performing the one or more beam training phases as part of the beam training procedure based on one or more metrics associated with the second device or the first device.

In some examples, the one or more metrics corresponding to a differential between a first number of antenna elements associated with the first device and a second number of antenna elements associated with the second device.

In some examples, the one or more beam training phases of the beam training procedure performed at the first device based on the first number of antenna elements being greater than the second number of antenna elements.

In some examples, the one or more metrics including a first power consumption metric associated with the first device and a second power consumption metric associated with the second device. In some examples, a number of symbols allocated for the one or more beam training phases is based on a differential between the first power consumption metric associated with the first device and the second power consumption metric associated with the second device.

In some examples, the one or more metrics including a first thermal metric associated with the first device and a second thermal metric associated with the second device. In some examples, a number of symbols allocated for the one or more beam training phases is based on a differential between the first thermal metric associated with the first device and the second thermal metric associated with the second device.

In some examples, the one or more beam training phases based on the one or more metrics including a first MPE metric associated with the first device and a second MPE metric associated with the second device.

In some examples, the one or more metrics including a first mobility state associated with the first device and a second mobility state associated with the second device, and the mobility state transmission component 1140 may be configured as or otherwise support a means for transmitting, to the first device, an indication of the second mobility state associated with the second device, the one or more beam training phases based on the first mobility state and the second mobility state.

In some examples, the mobility state receive component 1145 may be configured as or otherwise support a means for receiving, from the first device, an indication of the first mobility state associated with the first device.

In some examples, the one or more beam training phases based on the one or more metrics including a first type of blockage associated with the first device and a second type of blockage associated with the second device.

In some examples, the one or more beam training phases based on a number of antenna elements associated with the first device, the second device, or both, a power consumption differential between the first device and the second device, a thermal differential between the first device and the second device, one or more MPE metrics, a type of blockage for the first device, the second device, or both, a mobility state for the first device, the second device, or both, or any combination thereof.

In some examples, the second indication includes an acknowledgement of the one or more beam training phases, one or more additional beam training phases to be performed by the second device, a modification of the beam training procedure, or any combination thereof.

In some examples, the beam training procedure including a partial beam training procedure, the one or more beam training phases associated with a first subset of a total number of antenna elements of the first device, a second subset of a total number of antenna elements of the second device, or both.

In some examples, the beam training procedure including a partial beam training procedure, the one or more beam training phases associated with a first subset of a total number of resources allocated for transmissions of the one or more signals by the first device, a second subset of a total number of resources allocated for transmissions of the one or more signals by the second device, or both.

In some examples, the beam refinement component 1135 may be configured as or otherwise support a means for receiving, from the first device, the one or more signals via the one or more communication beams based on the beam training procedure and in accordance with the sequence of the one or more beam training phases.

In some examples, the beam refinement component 1135 may be configured as or otherwise support a means for transmitting, to the first device, the one or more signals via the one or more communication beams based on the beam training procedure and in accordance with the sequence of the one or more beam training phases.

In some examples, the one or more beam training phases of the beam training procedure performed using a set of antenna element resources or a set of reference signal resources.

In some examples, the one or more beam training phases include a first beam training phase corresponding to a wide beam selection phase, a second beam training phase corresponding to a first beam refinement phase at the first device, and a third beam training phase corresponding to a second beam refinement phase at the second device.

In some examples, the sequence of the one or more beam training phases indicates a device order of performing the one or more beam training phases at the first device, the second device, or both.

Figure 12:
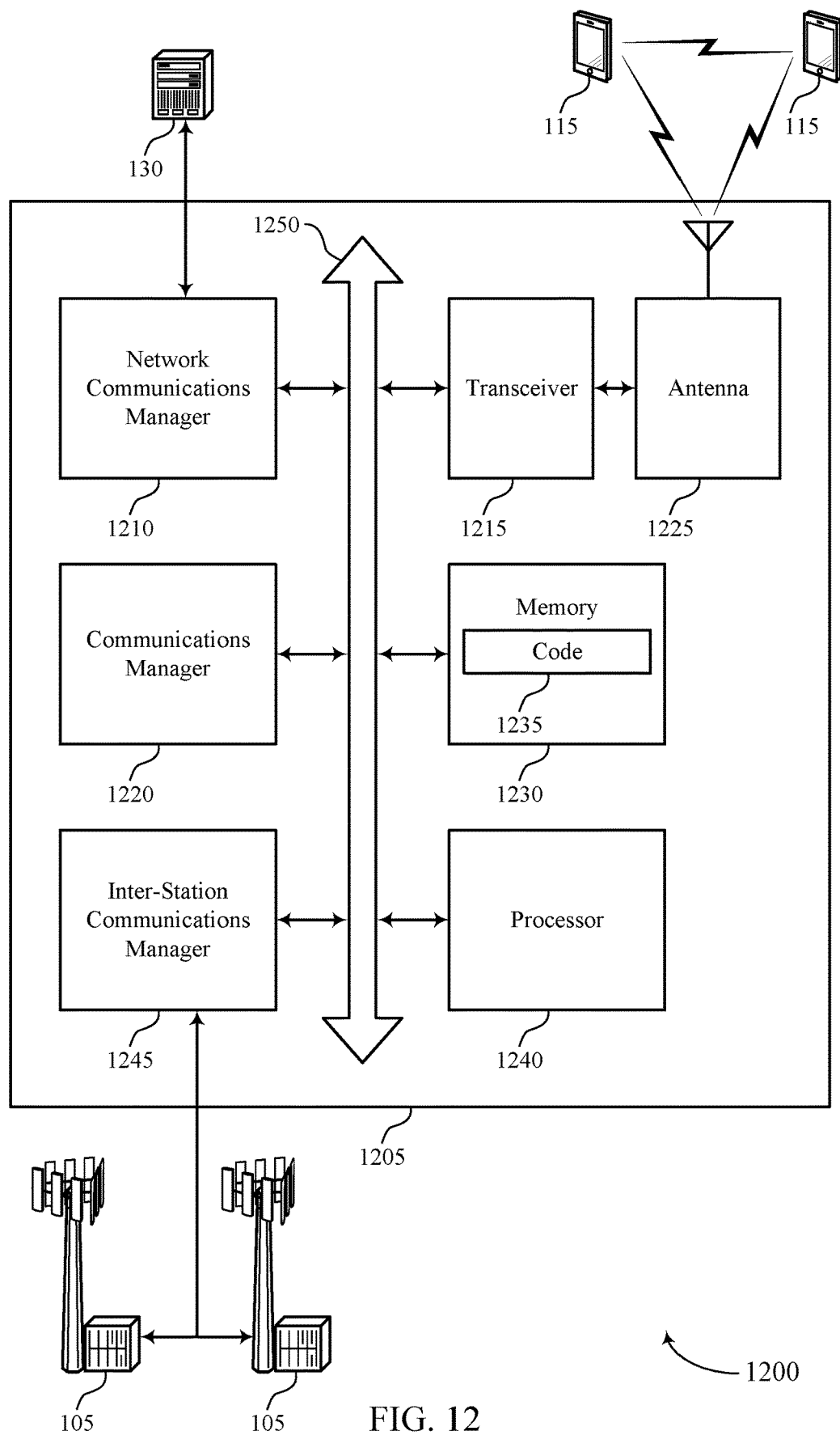
FIG. 12 shows a diagram of a system including a device that supports bi-directional beam refinement coordination for wireless systems in accordance with one or more aspects of the present disclosure.

FIG. 12 shows a diagram of a system 1200 including a device 1205 that supports bi-directional beam refinement coordination for wireless systems in accordance with one or more aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting bi-directional beam refinement coordination for wireless systems). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communications at a second device in a wireless network in accordance with examples as disclosed herein. For example, the communications manager 1220 may be configured as or otherwise support a means for receiving, from a first device in the wireless network, a first indication of a sequence of one or more beam training phases for a beam training procedure between the second device and the first device. The communications manager 1220 may be configured as or otherwise support a means for transmitting, to the first device, a second indication corresponding to the beam training procedure in response to receiving the first indication. The communications manager 1220 may be configured as or otherwise support a means for communicating, based on the first and second indications, one or more signals with the first device via one or more communication beams to perform the one or more beam training phases as part of the beam training procedure, the communicating the one or more signals in accordance with the sequence of the one or more beam training phases.

By including or configuring the communications manager 1220 in accordance with examples as described herein, the device 1205 may support techniques for increased communication reliability, reduced latency, increased user experience related to more reliable signaling, reduced power consumption, more efficient utilization of communication resources, increased coordination between devices, longer battery life, increased utilization of processing capability, among other benefits.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of bi-directional beam refinement coordination for wireless systems as described herein, or the processor 1240 and the memory 1230 may be otherwise configured to perform or support such operations.

Figure 13:
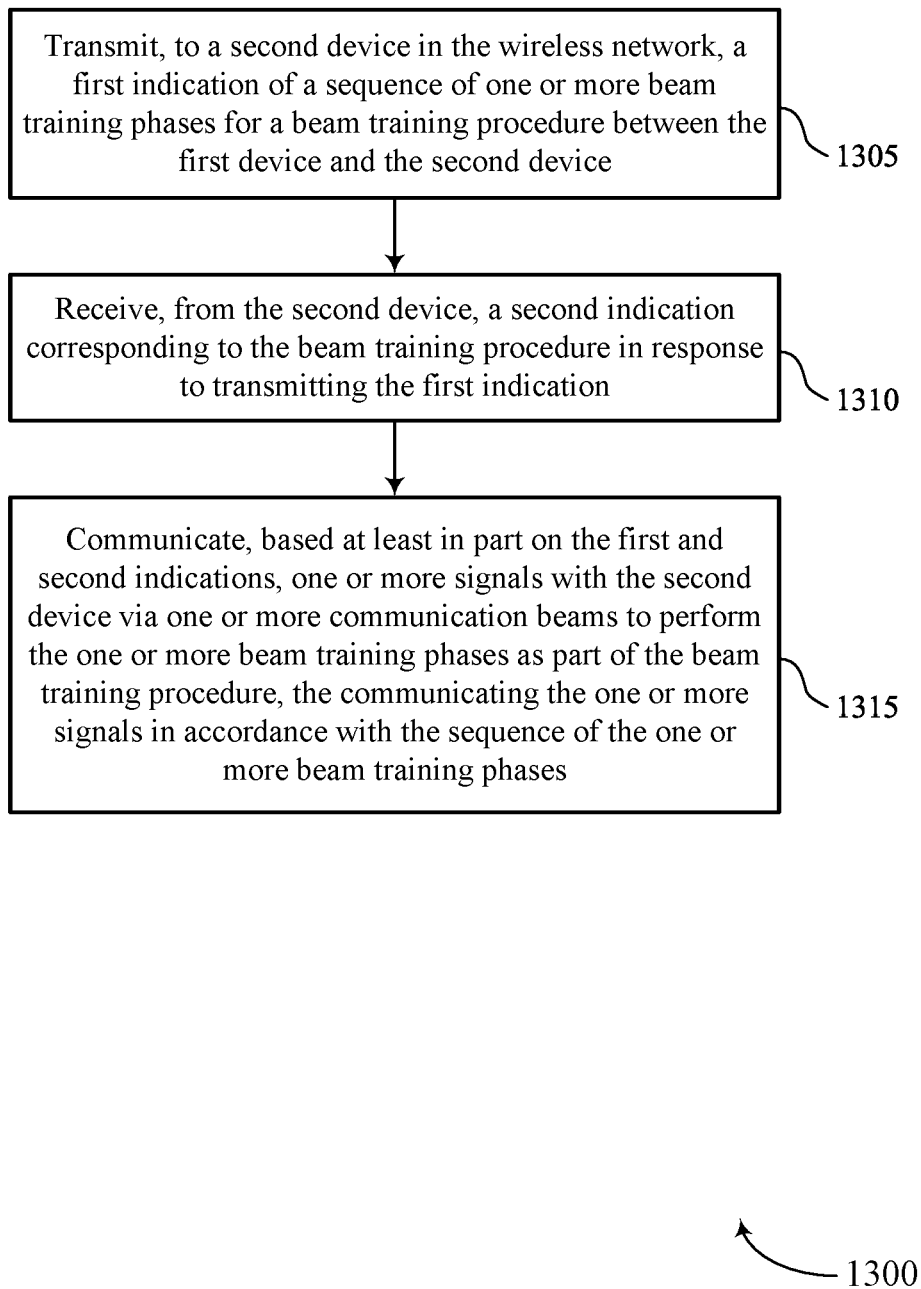
FIGS. 13 through 20 show flowcharts illustrating methods that support bi-directional beam refinement coordination for wireless systems in accordance with one or more aspects of the present disclosure.

FIG. 13 shows a flowchart illustrating a method 1300 that supports bi-directional beam refinement coordination for wireless systems in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include transmitting, to a second device in the wireless network, a first indication of a sequence of one or more beam training phases for a beam training procedure between the first device and the second device. The operations of 1305 may be performed in accordance with examples as disclosed herein. In some examples, aspects of the operations of 1305 may be performed by a beam training sequence indication component 725 as described with reference to FIG. 7.

At 1310, the method may include receiving, from the second device, a second indication corresponding to the beam training procedure in response to transmitting the first indication. The operations of 1310 may be performed in accordance with examples as disclosed herein. In some examples, aspects of the operations of 1310 may be performed by a beam training acknowledgement component 730 as described with reference to FIG. 7.

At 1315, the method may include communicating, based on the first and second indications, one or more signals with the second device via one or more communication beams to perform the one or more beam training phases as part of the beam training procedure, the communicating the one or more signals in accordance with the sequence of the one or more beam training phases. The operations of 1315 may be performed in accordance with examples as disclosed herein.

In some examples, aspects of the operations of 1315 may be performed by a beam refinement component 735 as described with reference to FIG. 7.

Figure 14:
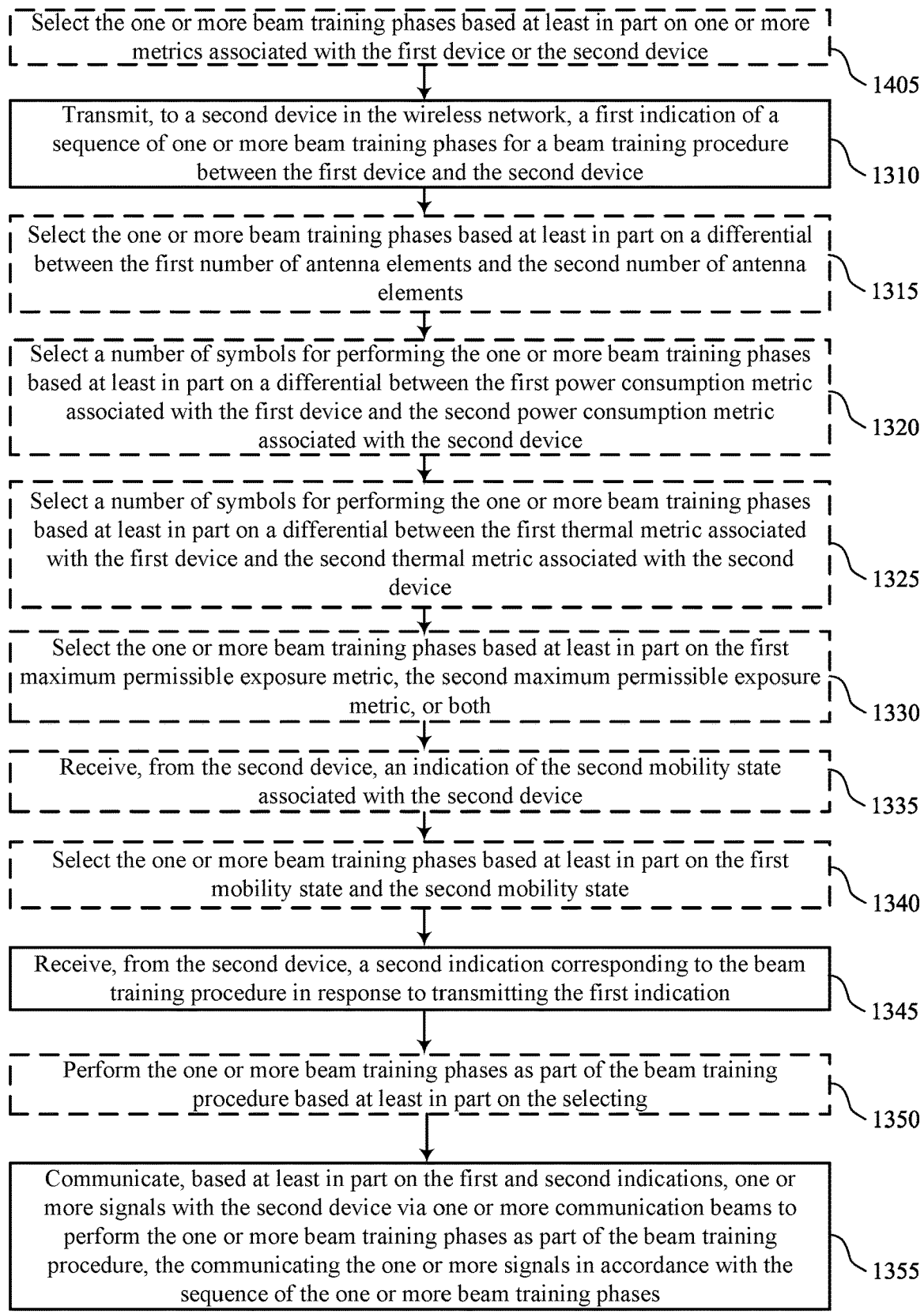

FIG. 14 shows a flowchart illustrating a method 1400 that supports bi-directional beam refinement coordination for wireless systems in accordance with one or more aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include selecting the one or more beam training phases based on one or more metrics associated with the first device or the second device. The operations of 1405 may be performed in accordance with examples as disclosed herein. In some examples, aspects of the operations of 1405 may be performed by a beam training sequence selection component 740 as described with reference to FIG. 7.

At 1410, the method may include transmitting, to a second device in the wireless network, a first indication of a sequence of one or more beam training phases for a beam training procedure between the first device and the second device. The operations of 1410 may be performed in accordance with examples as disclosed herein. In some examples, aspects of the operations of 1410 may be performed by a beam training sequence indication component 725 as described with reference to FIG. 7.

At 1415, the method may include selecting the one or more beam training phases based on a differential between a first number of antenna elements and a second number of antenna elements. The operations of 1415 may be performed in accordance with examples as disclosed herein. In some examples, aspects of the operations of 1415 may be performed by a beam training sequence selection component 740 as described with reference to FIG. 7.

At 1420, the method may include selecting a number of symbols for performing the one or more beam training phases based on a differential between the first power consumption metric associated with the first device and the second power consumption metric associated with the second device. The operations of 1420 may be performed in accordance with examples as disclosed herein. In some examples, aspects of the operations of 1420 may be performed by a beam training resource selection component 745 as described with reference to FIG. 7.

At 1425, the method may include selecting a number of symbols for performing the one or more beam training phases based on a differential between the first thermal metric associated with the first device and the second thermal metric associated with the second device. The operations of 1425 may be performed in accordance with examples as disclosed herein. In some examples, aspects of the operations of 1425 may be performed by a beam training resource selection component 745 as described with reference to FIG. 7.

At 1430, the method may include selecting the one or more beam training phases based on the first MPE metric, the second MPE metric, or both. The operations of 1430 may be performed in accordance with examples as disclosed herein. In some examples, aspects of the operations of 1430 may be performed by a beam training sequence selection component 740 as described with reference to FIG. 7.

At 1435, the method may include receiving, from the second device, an indication of the second mobility state associated with the second device. The operations of 1435 may be performed in accordance with examples as disclosed herein. In some examples, aspects of the operations of 1435 may be performed by a mobility state receive component 750 as described with reference to FIG. 7.

At 1440, the method may include selecting the one or more beam training phases based on the first mobility state and the second mobility state. The operations of 1440 may be performed in accordance with examples as disclosed herein. In some examples, aspects of the operations of 1440 may be performed by a beam training sequence selection component 740 as described with reference to FIG. 7.

At 1445, the method may include receiving, from the second device, a second indication corresponding to the beam training procedure in response to transmitting the first indication. The operations of 1445 may be performed in accordance with examples as disclosed herein. In some examples, aspects of the operations of 1445 may be performed by a beam training acknowledgement component 730 as described with reference to FIG. 7.

At 1450, the method may include performing the one or more beam training phases as part of the beam training procedure based on the selecting. The operations of 1450 may be performed in accordance with examples as disclosed herein. In some examples, aspects of the operations of 1450 may be performed by a beam refinement component 735 as described with reference to FIG. 7.

At 1455, the method may include communicating, based on the first and second indications, one or more signals with the second device via one or more communication beams to perform the one or more beam training phases as part of the beam training procedure, the communicating the one or more signals in accordance with the sequence of the one or more beam training phases. The operations of 1455 may be performed in accordance with examples as disclosed herein. In some examples, aspects of the operations of 1455 may be performed by a beam refinement component 735 as described with reference to FIG. 7.

Figure 15:
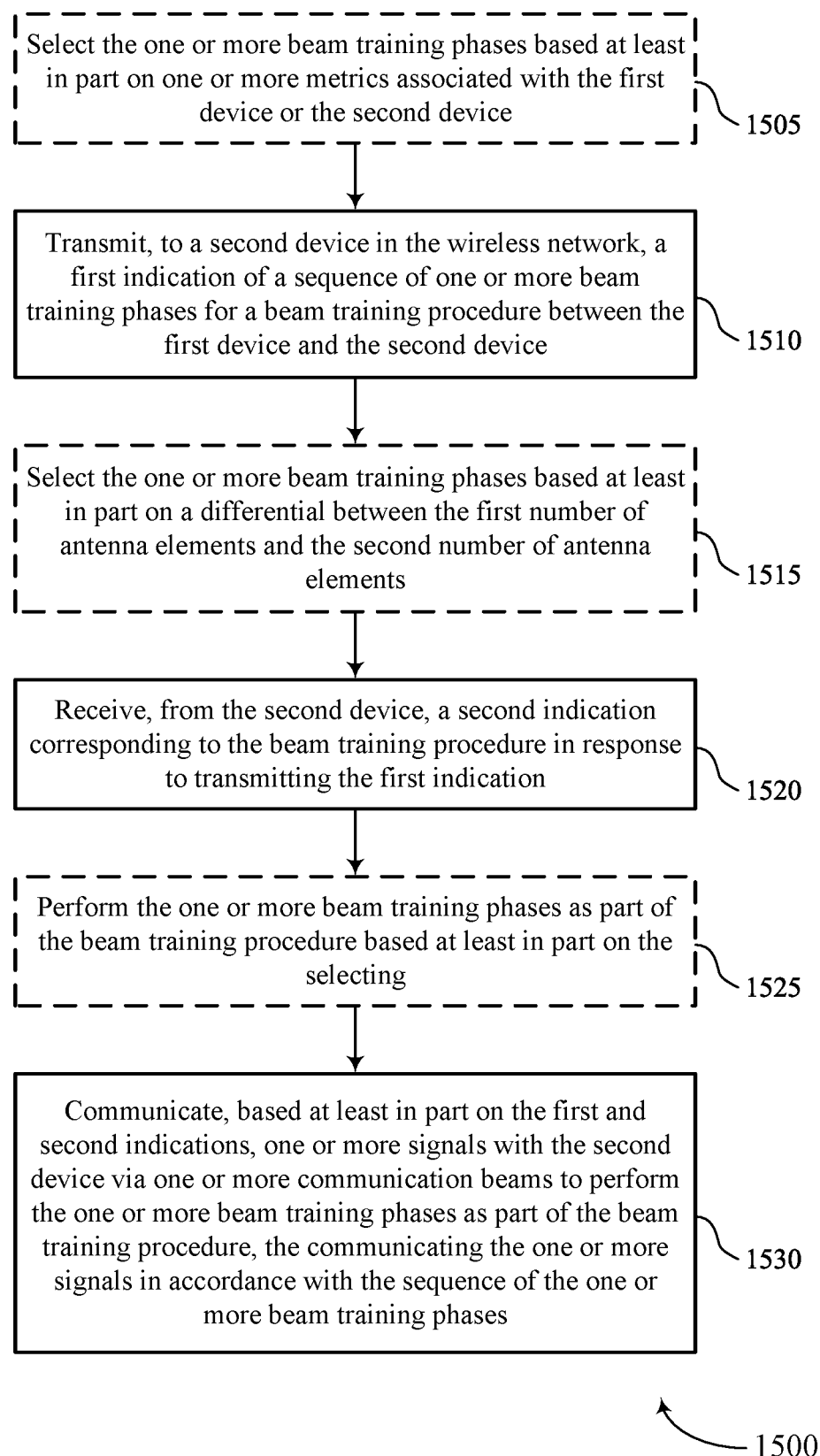

FIG. 15 shows a flowchart illustrating a method 1500 that supports bi-directional beam refinement coordination for wireless systems in accordance with one or more aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include selecting the one or more beam training phases based on one or more metrics associated with the first device or the second device. The operations of 1505 may be performed in accordance with examples as disclosed herein. In some examples, aspects of the operations of 1505 may be performed by a beam training sequence selection component 740 as described with reference to FIG. 7.

At 1510, the method may include transmitting, to a second device in the wireless network, a first indication of a sequence of one or more beam training phases for a beam training procedure between the first device and the second device. The operations of 1510 may be performed in accordance with examples as disclosed herein. In some examples, aspects of the operations of 1510 may be performed by a beam training sequence indication component 725 as described with reference to FIG. 7.

At 1515, the method may include selecting the one or more beam training phases based on a differential between a first number of antenna elements and a second number of antenna elements. The operations of 1515 may be performed in accordance with examples as disclosed herein. In some examples, aspects of the operations of 1515 may be performed by a beam training sequence selection component 740 as described with reference to FIG. 7.

At 1520, the method may include receiving, from the second device, a second indication corresponding to the beam training procedure in response to transmitting the first indication. The operations of 1520 may be performed in accordance with examples as disclosed herein. In some examples, aspects of the operations of 1520 may be performed by a beam training acknowledgement component 730 as described with reference to FIG. 7.

At 1525, the method may include performing the one or more beam training phases as part of the beam training procedure based on the selecting. The operations of 1525 may be performed in accordance with examples as disclosed herein. In some examples, aspects of the operations of 1525 may be performed by a beam refinement component 735 as described with reference to FIG. 7.

At 1530, the method may include communicating, based on the first and second indications, one or more signals with the second device via one or more communication beams to perform the one or more beam training phases as part of the beam training procedure, the communicating the one or more signals in accordance with the sequence of the one or more beam training phases. The operations of 1530 may be performed in accordance with examples as disclosed herein. In some examples, aspects of the operations of 1530 may be performed by a beam refinement component 735 as described with reference to FIG. 7.

Figure 16:
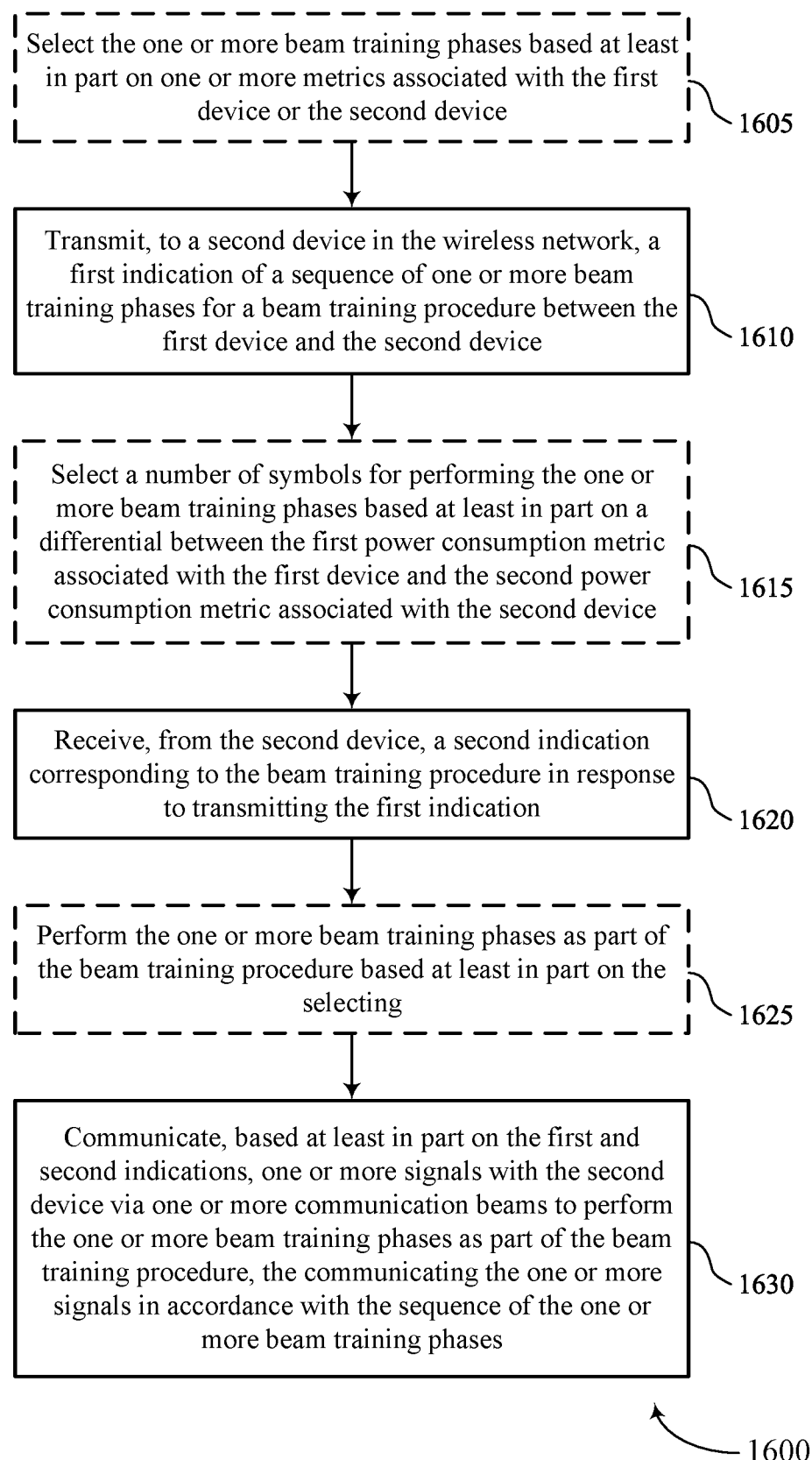

FIG. 16 shows a flowchart illustrating a method 1600 that supports bi-directional beam refinement coordination for wireless systems in accordance with one or more aspects of the present disclosure. The operations of the method 1600 may be implemented by a UE or its components as described herein. For example, the operations of the method 1600 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1605, the method may include selecting the one or more beam training phases based on one or more metrics associated with the first device or the second device. The operations of 1605 may be performed in accordance with examples as disclosed herein. In some examples, aspects of the operations of 1605 may be performed by a beam training sequence selection component 740 as described with reference to FIG. 7.

At 1610, the method may include transmitting, to a second device in the wireless network, a first indication of a sequence of one or more beam training phases for a beam training procedure between the first device and the second device. The operations of 1610 may be performed in accordance with examples as disclosed herein. In some examples, aspects of the operations of 1610 may be performed by a beam training sequence indication component 725 as described with reference to FIG. 7.

At 1615, the method may include selecting a number of symbols for performing the one or more beam training phases based on a differential between the first power consumption metric associated with the first device and the second power consumption metric associated with the second device. The operations of 1615 may be performed in accordance with examples as disclosed herein. In some examples, aspects of the operations of 1615 may be performed by a beam training resource selection component 745 as described with reference to FIG. 7.

At 1620, the method may include receiving, from the second device, a second indication corresponding to the beam training procedure in response to transmitting the first indication. The operations of 1620 may be performed in accordance with examples as disclosed herein. In some examples, aspects of the operations of 1620 may be performed by a beam training acknowledgement component 730 as described with reference to FIG. 7.

At 1625, the method may include performing the one or more beam training phases as part of the beam training procedure based on the selecting. The operations of 1625 may be performed in accordance with examples as disclosed herein. In some examples, aspects of the operations of 1625 may be performed by a beam refinement component 735 as described with reference to FIG. 7.

At 1630, the method may include communicating, based on the first and second indications, one or more signals with the second device via one or more communication beams to perform the one or more beam training phases as part of the beam training procedure, the communicating the one or more signals in accordance with the sequence of the one or more beam training phases. The operations of 1630 may be performed in accordance with examples as disclosed herein. In some examples, aspects of the operations of 1630 may be performed by a beam refinement component 735 as described with reference to FIG. 7.

Figure 17:
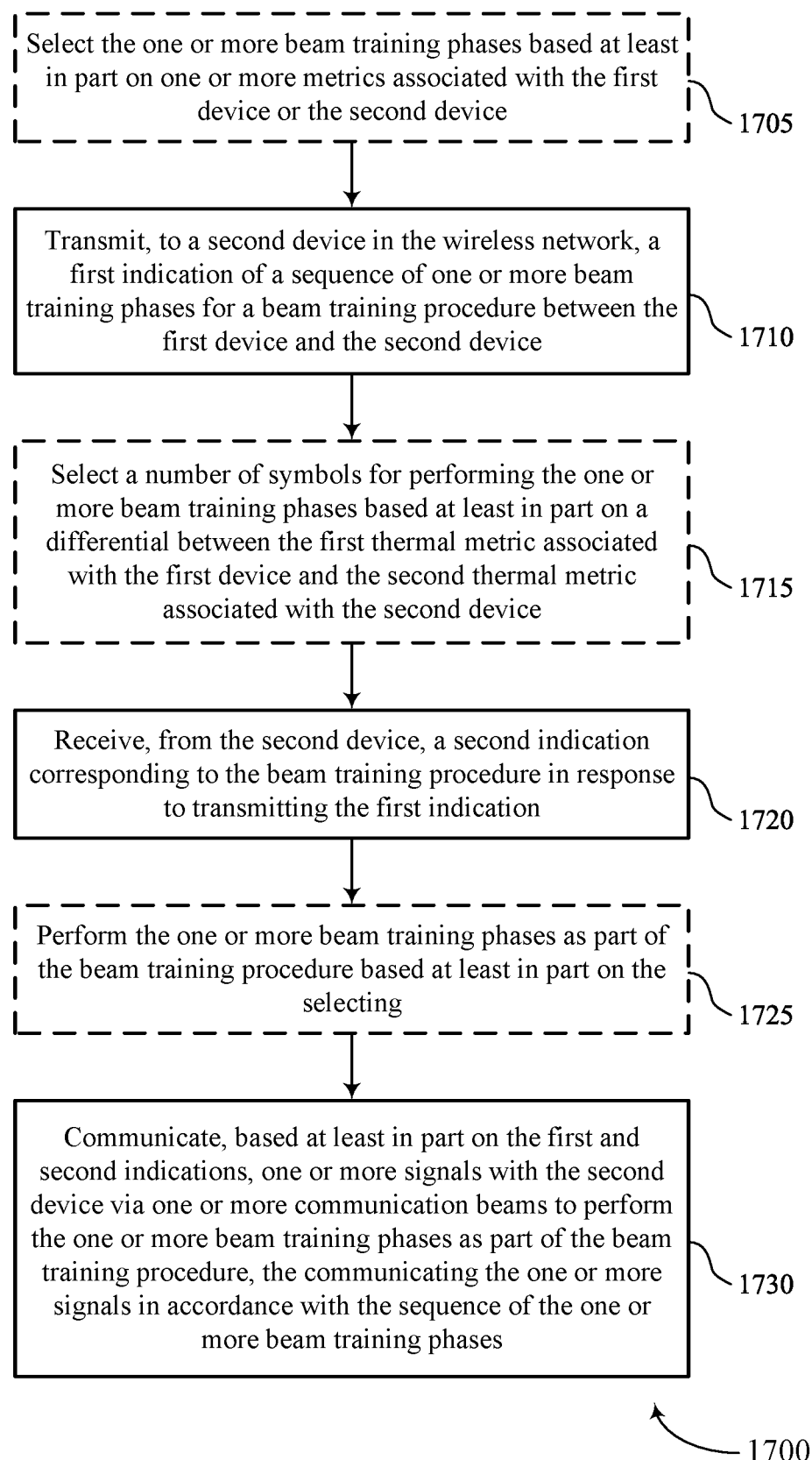

FIG. 17 shows a flowchart illustrating a method 1700 that supports bi-directional beam refinement coordination for wireless systems in accordance with one or more aspects of the present disclosure. The operations of the method 1700 may be implemented by a UE or its components as described herein. For example, the operations of the method 1700 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1705, the method may include selecting the one or more beam training phases based on one or more metrics associated with the first device or the second device. The operations of 1705 may be performed in accordance with examples as disclosed herein. In some examples, aspects of the operations of 1705 may be performed by a beam training sequence selection component 740 as described with reference to FIG. 7.

At 1710, the method may include transmitting, to a second device in the wireless network, a first indication of a sequence of one or more beam training phases for a beam training procedure between the first device and the second device. The operations of 1710 may be performed in accordance with examples as disclosed herein. In some examples, aspects of the operations of 1710 may be performed by a beam training sequence indication component 725 as described with reference to FIG. 7.

At 1715, the method may include selecting a number of symbols for performing the one or more beam training phases based on a differential between the first thermal metric associated with the first device and the second thermal metric associated with the second device. The operations of 1715 may be performed in accordance with examples as disclosed herein. In some examples, aspects of the operations of 1715 may be performed by a beam training resource selection component 745 as described with reference to FIG. 7.

At 1720, the method may include receiving, from the second device, a second indication corresponding to the beam training procedure in response to transmitting the first indication. The operations of 1720 may be performed in accordance with examples as disclosed herein. In some examples, aspects of the operations of 1720 may be performed by a beam training acknowledgement component 730 as described with reference to FIG. 7.

At 1725, the method may include performing the one or more beam training phases as part of the beam training procedure based on the selecting. The operations of 1725 may be performed in accordance with examples as disclosed herein. In some examples, aspects of the operations of 1725 may be performed by a beam refinement component 735 as described with reference to FIG. 7.

At 1730, the method may include communicating, based on the first and second indications, one or more signals with the second device via one or more communication beams to perform the one or more beam training phases as part of the beam training procedure, the communicating the one or more signals in accordance with the sequence of the one or more beam training phases. The operations of 1730 may be performed in accordance with examples as disclosed herein. In some examples, aspects of the operations of 1730 may be performed by a beam refinement component 735 as described with reference to FIG. 7.

Figure 18:
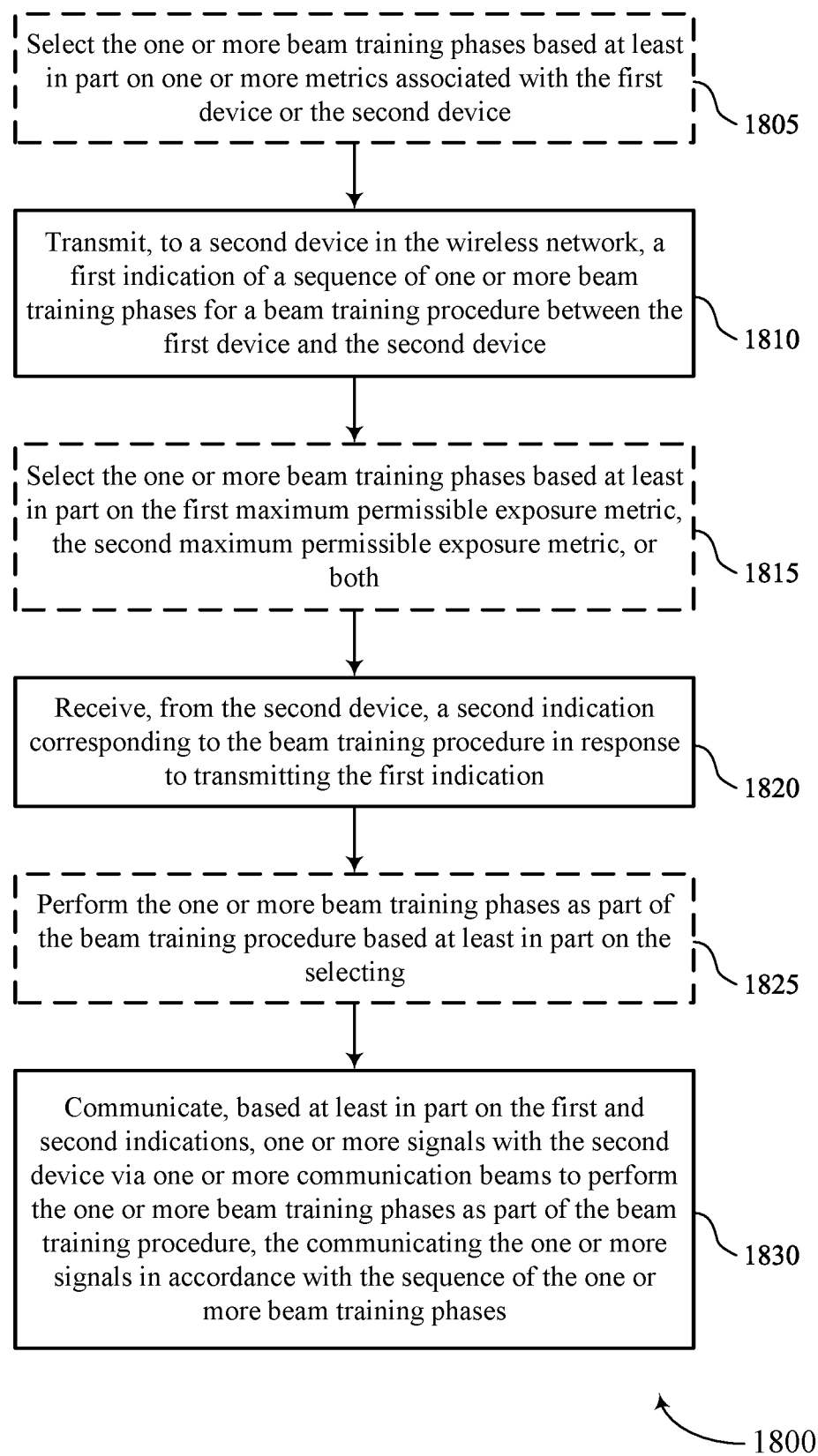

FIG. 18 shows a flowchart illustrating a method 1800 that supports bi-directional beam refinement coordination for wireless systems in accordance with one or more aspects of the present disclosure. The operations of the method 1800 may be implemented by a UE or its components as described herein. For example, the operations of the method 1800 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1805, the method may include selecting the one or more beam training phases based on one or more metrics associated with the first device or the second device. The operations of 1805 may be performed in accordance with examples as disclosed herein. In some examples, aspects of the operations of 1805 may be performed by a beam training sequence selection component 740 as described with reference to FIG. 7.

At 1810, the method may include transmitting, to a second device in the wireless network, a first indication of a sequence of one or more beam training phases for a beam training procedure between the first device and the second device. The operations of 1810 may be performed in accordance with examples as disclosed herein. In some examples, aspects of the operations of 1810 may be performed by a beam training sequence indication component 725 as described with reference to FIG. 7.

At 1815, the method may include selecting the one or more beam training phases based on the first MPE metric, the second MPE metric, or both. The operations of 1815 may be performed in accordance with examples as disclosed herein. In some examples, aspects of the operations of 1815 may be performed by a beam training sequence selection component 740 as described with reference to FIG. 7.

At 1820, the method may include receiving, from the second device, a second indication corresponding to the beam training procedure in response to transmitting the first indication. The operations of 1820 may be performed in accordance with examples as disclosed herein. In some examples, aspects of the operations of 1820 may be performed by a beam training acknowledgement component 730 as described with reference to FIG. 7.

At 1825, the method may include performing the one or more beam training phases as part of the beam training procedure based on the selecting. The operations of 1825 may be performed in accordance with examples as disclosed herein. In some examples, aspects of the operations of 1825 may be performed by a beam refinement component 735 as described with reference to FIG. 7.

At 1830, the method may include communicating, based on the first and second indications, one or more signals with the second device via one or more communication beams to perform the one or more beam training phases as part of the beam training procedure, the communicating the one or more signals in accordance with the sequence of the one or more beam training phases. The operations of 1830 may be performed in accordance with examples as disclosed herein. In some examples, aspects of the operations of 1830 may be performed by a beam refinement component 735 as described with reference to FIG. 7.

Figure 19:
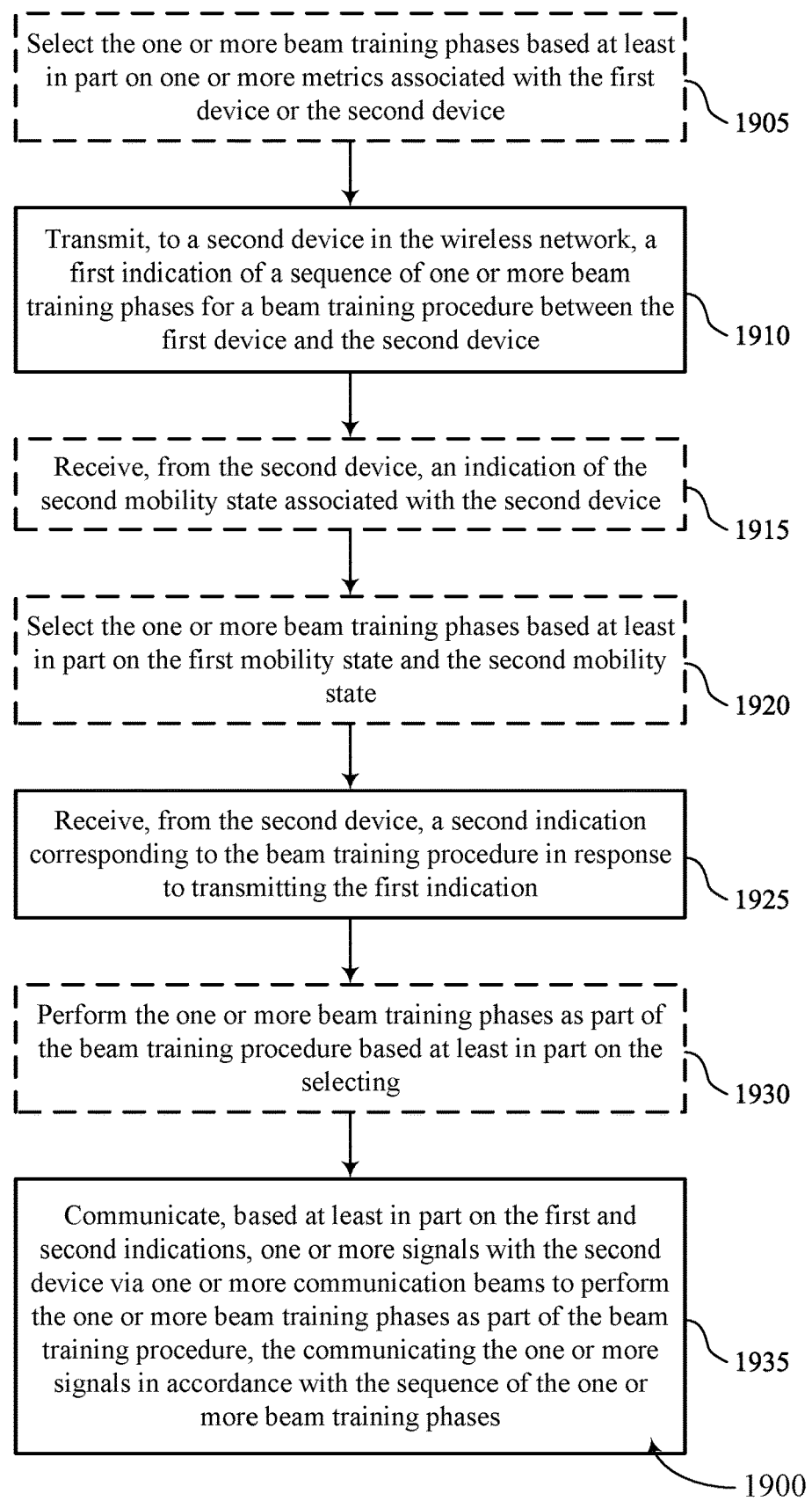

FIG. 19 shows a flowchart illustrating a method 1900 that supports bi-directional beam refinement coordination for wireless systems in accordance with one or more aspects of the present disclosure. The operations of the method 1900 may be implemented by a UE or its components as described herein. For example, the operations of the method 1900 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1905, the method may include selecting the one or more beam training phases based on one or more metrics associated with the first device or the second device. The operations of 1905 may be performed in accordance with examples as disclosed herein. In some examples, aspects of the operations of 1905 may be performed by a beam training sequence selection component 740 as described with reference to FIG. 7.

At 1910, the method may include transmitting, to a second device in the wireless network, a first indication of a sequence of one or more beam training phases for a beam training procedure between the first device and the second device. The operations of 1910 may be performed in accordance with examples as disclosed herein. In some examples, aspects of the operations of 1910 may be performed by a beam training sequence indication component 725 as described with reference to FIG. 7.

At 1915, the method may include receiving, from the second device, an indication of the second mobility state associated with the second device. The operations of 1915 may be performed in accordance with examples as disclosed herein. In some examples, aspects of the operations of 1915 may be performed by a mobility state receive component 750 as described with reference to FIG. 7.

At 1920, the method may include selecting the one or more beam training phases based on the first mobility state and the second mobility state. The operations of 1920 may be performed in accordance with examples as disclosed herein. In some examples, aspects of the operations of 1920 may be performed by a beam training sequence selection component 740 as described with reference to FIG. 7.

At 1925, the method may include receiving, from the second device, a second indication corresponding to the beam training procedure in response to transmitting the first indication. The operations of 1925 may be performed in accordance with examples as disclosed herein. In some examples, aspects of the operations of 1925 may be performed by a beam training acknowledgement component 730 as described with reference to FIG. 7.

At 1930, the method may include performing the one or more beam training phases as part of the beam training procedure based on the selecting. The operations of 1930 may be performed in accordance with examples as disclosed herein. In some examples, aspects of the operations of 1930 may be performed by a beam refinement component 735 as described with reference to FIG. 7.

At 1935, the method may include communicating, based on the first and second indications, one or more signals with the second device via one or more communication beams to perform the one or more beam training phases as part of the beam training procedure, the communicating the one or more signals in accordance with the sequence of the one or more beam training phases. The operations of 1935 may be performed in accordance with examples as disclosed herein. In some examples, aspects of the operations of 1935 may be performed by a beam refinement component 735 as described with reference to FIG. 7.

Figure 20:
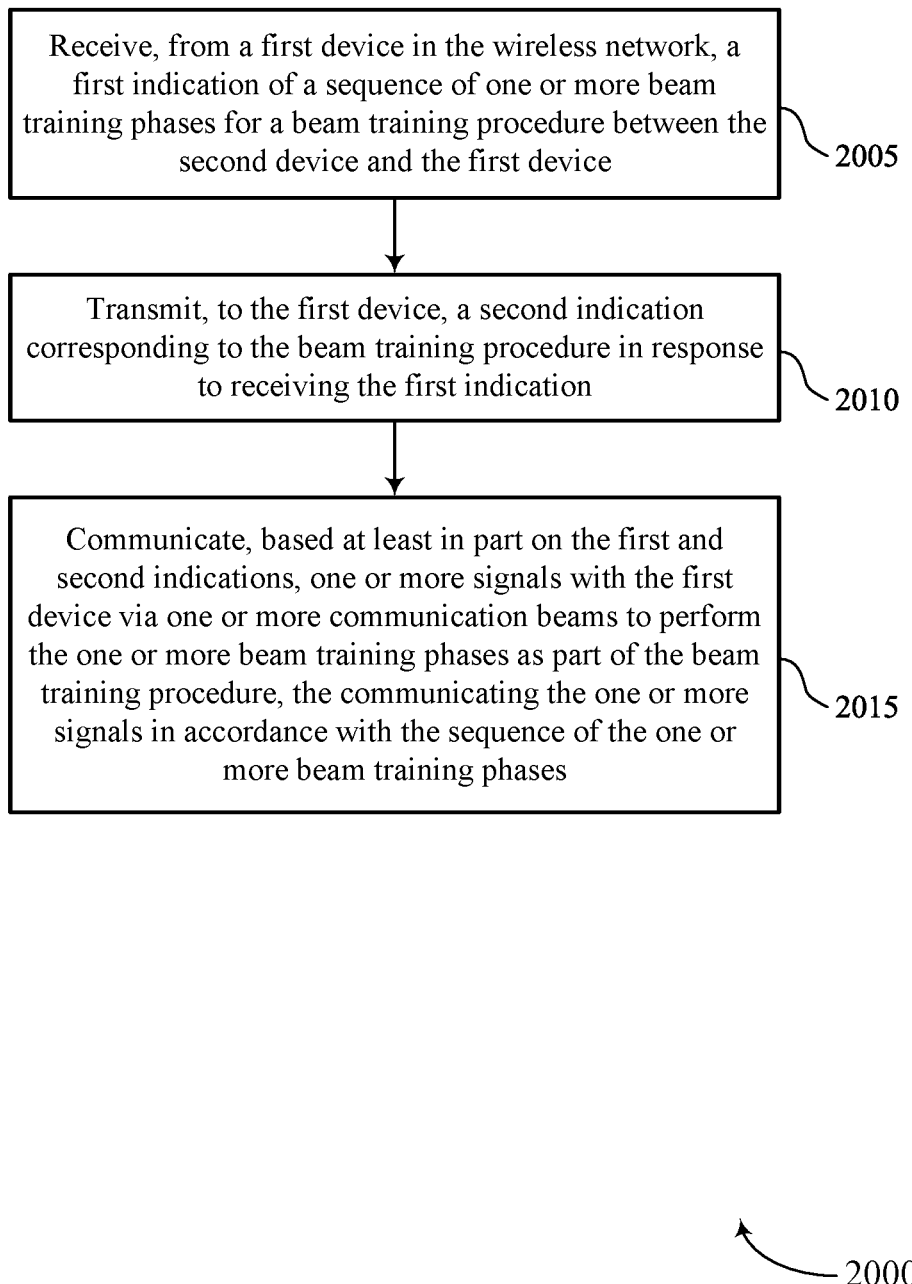

FIG. 20 shows a flowchart illustrating a method 2000 that supports bi-directional beam refinement coordination for wireless systems in accordance with one or more aspects of the present disclosure. The operations of the method 2000 may be implemented by a base station or its components as described herein. For example, the operations of the method 2000 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 2005, the method may include receiving, from a first device in the wireless network, a first indication of a sequence of one or more beam training phases for a beam training procedure between the second device and the first device. The operations of 2005 may be performed in accordance with examples as disclosed herein. In some examples, aspects of the operations of 2005 may be performed by a beam training sequence indication component 1125 as described with reference to FIG. 11.

At 2010, the method may include transmitting, to the first device, a second indication corresponding to the beam training procedure in response to receiving the first indication. The operations of 2010 may be performed in accordance with examples as disclosed herein. In some examples, aspects of the operations of 2010 may be performed by a beam training acknowledgement component 1130 as described with reference to FIG. 11.

At 2015, the method may include communicating, based on the first and second indications, one or more signals with the first device via one or more communication beams to perform the one or more beam training phases as part of the beam training procedure, the communicating the one or more signals in accordance with the sequence of the one or more beam training phases. The operations of 2015 may be performed in accordance with examples as disclosed herein. In some examples, aspects of the operations of 2015 may be performed by a beam refinement component 1135 as described with reference to FIG. 11.

The following provides an overview of aspects of the present disclosure:

Aspect 1: A method for wireless communications at a first device in a wireless network, comprising: transmitting, to a second device in the wireless network, a first indication of a sequence of one or more beam training phases for a beam training procedure between the first device and the second device: receiving, from the second device, a second indication corresponding to the beam training procedure in response to transmitting the first indication: and communicating, based at least in part on the first and second indications, one or more signals with the second device via one or more communication beams to perform the one or more beam training phases as part of the beam training procedure, the communicating the one or more signals in accordance with the sequence of the one or more beam training phases.

Aspect 2: The method of aspect 1, further comprising: selecting the one or more beam training phases based at least in part on one or more metrics associated with the first device or the second device: and performing the one or more beam training phases as part of the beam training procedure based at least in part on the selecting.

Aspect 3: The method of aspect 2, wherein the one or more metrics comprising a first number of antenna elements associated with the first device and a second number of antenna elements associated with the second device, the selecting comprising selecting the one or more beam training phases based at least in part on a differential between a first number of antenna elements and a second number of antenna elements.

Aspect 4: The method of aspect 3, further comprising: performing the one or more beam training phases of the beam training procedure at the first device based at least in part on the first number of antenna elements being greater than the second number of antenna elements.

Aspect 5: The method of any of aspects 2 through 4, wherein the one or more metrics comprising a first power consumption metric associated with the first device and a second power consumption metric associated with the second device, the method further comprising: selecting a number of symbols for performing the one or more beam training phases based at least in part on a differential between the first power consumption metric associated with the first device and the second power consumption metric associated with the second device.

Aspect 6: The method of any of aspects 2 through 5, wherein the one or more metrics comprising a first thermal metric associated with the first device and a second thermal metric associated with the second device, the method further comprising: selecting a number of symbols for performing the one or more beam training phases based at least in part on a differential between the first thermal metric associated with the first device and the second thermal metric associated with the second device.

Aspect 7: The method of any of aspects 2 through 6, wherein the one or more metrics comprising a first MPE metric associated with the first device and a second MPE metric associated with the second device, the method further comprising: selecting the one or more beam training phases based at least in part on the first MPE metric, the second MPE metric, or both.

Aspect 8: The method of any of aspects 2 through 7, wherein the one or more metrics comprising a first mobility state associated with the first device and a second mobility state associated with the second device, the method further comprising: receiving, from the second device, an indication of the second mobility state associated with the second device; and selecting the one or more beam training phases based at least in part on the first mobility state and the second mobility state.

Aspect 9: The method of aspect 8, further comprising: selecting the one or more beam training phases based at least in part on the first mobility state corresponding to a lower mobility relative to the second mobility state.

Aspect 10: The method of any of aspects 8 through 9, further comprising: transmitting, to the second device, an indication of the first mobility state associated with the first device.

Aspect 11: The method of any of aspects 2 through 10, wherein the one or more metrics comprising a first type of blockage associated with the first device and a second type of blockage associated with the second device, the selecting comprising selecting the one or more beam training phases as part of the beam training procedure based at least in part on a first type of blockage and a second type of blockage.

Aspect 12: The method of any of aspects 1 through 11, further comprising: selecting the one or more beam training phases based at least in part on a number of antenna elements associated with the first device, the second device, or both, a power consumption differential between the first device and the second device, a thermal differential between the first device and the second device, one or more MPE metrics, a type of blockage for the first device, the second device, or both, a mobility state for the first device, the second device, or both, or any combination thereof.

Aspect 13: The method of any of aspects 1 through 12, wherein the second indication comprises an acknowledgement of the one or more beam training phases, one or more additional beam training phases to be performed by the second device, a modification of the beam training procedure, or any combination thereof.

Aspect 14: The method of any of aspects 1 through 13, wherein the beam training procedure comprising a partial beam training procedure, the method further comprising: selecting the one or more beam training phases in accordance with a first subset of a total number of antenna elements of the first device, a second subset of a total number of antenna elements of the second device, or both.

Aspect 15: The method of any of aspects 1 through 14, wherein the beam training procedure comprising a partial beam training procedure, the method further comprising: selecting the one or more beam training phases in accordance with a first subset of a total number of resources allocated for transmissions of the one or more signals by the first device, a second subset of a total number of resources allocated for transmissions of the one or more signals by the second device, or both.

Aspect 16: The method of any of aspects 1 through 15, wherein the communicating further comprises: transmitting, to the second device, the one or more signals via the one or more communication beams based at least in part on the beam training procedure and in accordance with the sequence of the one or more beam training phases.

Aspect 17: The method of any of aspects 1 through 16, wherein the communicating further comprises: receiving, from the second device, the one or more signals via the one or more communication beams based at least in part on the beam training procedure and in accordance with the sequence of the one or more beam training phases.

Aspect 18: The method of any of aspects 1 through 17, further comprising: selecting a set of antenna element resources or a set of reference signal resources for performing the one or more beam training phases of the beam training procedure, wherein the communicating the one or more signals is based at least in part on the set of antenna element resources or the set of reference signal resources.

Aspect 19: The method of any of aspects 1 through 18, wherein the one or more beam training phases comprise a first beam training phase corresponding to a wide beam selection phase, a second beam training phase corresponding to a first beam refinement phase at the first device, and a third beam training phase corresponding to a second beam refinement phase at the second device.

Aspect 20: The method of any of aspects 1 through 19, wherein the sequence of the one or more beam training phases indicates a device order of performing the one or more beam training phases at the first device, the second device, or both.

Aspect 21: A method for wireless communications at a second device in a wireless network, comprising: receiving, from a first device in the wireless network, a first indication of a sequence of one or more beam training phases for a beam training procedure between the second device and the first device: transmitting, to the first device, a second indication corresponding to the beam training procedure in response to receiving the first indication: and communicating, based at least in part on the first and second indications, one or more signals with the first device via one or more communication beams to perform the one or more beam training phases as part of the beam training procedure, the communicating the one or more signals in accordance with the sequence of the one or more beam training phases.

Aspect 22: The method of aspect 21, further comprising: performing the one or more beam training phases as part of the beam training procedure based at least in part on one or more metrics associated with the second device or the first device.

Aspect 23: The method of aspect 22, wherein the one or more metrics corresponding to a differential between a first number of antenna elements associated with the first device and a second number of antenna elements associated with the second device.

Aspect 24: The method of aspect 23, wherein the one or more beam training phases of the beam training procedure performed at the first device based at least in part on the first number of antenna elements being greater than the second number of antenna elements.

Aspect 25: The method of any of aspects 22 through 24, wherein the one or more metrics comprising a first power consumption metric associated with the first device and a second power consumption metric associated with the second device, a number of symbols allocated for the one or more beam training phases is based at least in part on a differential between the first power consumption metric associated with the first device and the second power consumption metric associated with the second device.

Aspect 26: The method of any of aspects 22 through 25, wherein the one or more metrics comprising a first thermal metric associated with the first device and a second thermal metric associated with the second device, a number of symbols allocated for the one or more beam training phases is based at least in part on a differential between the first thermal metric associated with the first device and the second thermal metric associated with the second device.

Aspect 27: The method of any of aspects 22 through 26, wherein the one or more beam training phases based at least in part on the one or more metrics comprising a first MPE metric associated with the first device and a second MPE metric associated with the second device.

Aspect 28: The method of any of aspects 22 through 27, wherein the one or more metrics comprising a first mobility state associated with the first device and a second mobility state associated with the second device, the method further comprising: transmitting, to the first device, an indication of the second mobility state associated with the second device, the one or more beam training phases based at least in part on the first mobility state and the second mobility state.

Aspect 29: The method of aspect 28, further comprising: receiving, from the first device, an indication of the first mobility state associated with the first device.

Aspect 30: The method of any of aspects 22 through 29, wherein the one or more beam training phases based at least in part on the one or more metrics comprising a first type of blockage associated with the first device and a second type of blockage associated with the second device.

Aspect 31: The method of any of aspects 21 through 30, wherein the one or more beam training phases based at least in part on a number of antenna elements associated with the first device, the second device, or both, a power consumption differential between the first device and the second device, a thermal differential between the first device and the second device, one or more MPE metrics, a type of blockage for the first device, the second device, or both, a mobility state for the first device, the second device, or both, or any combination thereof.

Aspect 32: The method of any of aspects 21 through 31, wherein the second indication comprises an acknowledgement of the one or more beam training phases, one or more additional beam training phases to be performed by the second device, a modification of the beam training procedure, or any combination thereof.

Aspect 33: The method of any of aspects 21 through 32, wherein the beam training procedure comprising a partial beam training procedure, the one or more beam training phases associated with a first subset of a total number of antenna elements of the first device, a second subset of a total number of antenna elements of the second device, or both.

Aspect 34: The method of any of aspects 21 through 33, wherein the beam training procedure comprising a partial beam training procedure, the one or more beam training phases associated with a first subset of a total number of resources allocated for transmissions of the one or more signals by the first device, a second subset of a total number of resources allocated for transmissions of the one or more signals by the second device, or both.

Aspect 35: The method of any of aspects 21 through 34, further comprising: receiving, from the first device, the one or more signals via the one or more communication beams based at least in part on the beam training procedure and in accordance with the sequence of the one or more beam training phases.

Aspect 36: The method of any of aspects 21 through 35, further comprising: transmitting, to the first device, the one or more signals via the one or more communication beams based at least in part on the beam training procedure and in accordance with the sequence of the one or more beam training phases.

Aspect 37: The method of any of aspects 21 through 36, wherein the one or more beam training phases of the beam training procedure performed using a set of antenna element resources or a set of reference signal resources.

Aspect 38: The method of any of aspects 21 through 37, wherein the one or more beam training phases comprise a first beam training phase corresponding to a wide beam selection phase, a second beam training phase corresponding to a first beam refinement phase at the first device, and a third beam training phase corresponding to a second beam refinement phase at the second device.

Aspect 39: The method of any of aspects 21 through 38, wherein the sequence of the one or more beam training phases indicates a device order of performing the one or more beam training phases at the first device, the second device, or both.

Aspect 40: An apparatus for wireless communications at a first device in a wireless network, comprising a processor: memory coupled with the processor; and instructions stored in the memory and executable by the processor to cause the apparatus to perform a method of any of aspects 1 through 20.

Aspect 41: An apparatus for wireless communications at a first device in a wireless network, comprising at least one means for performing a method of any of aspects 1 through 20.

Aspect 42: A non-transitory computer-readable medium storing code for wireless communications at a first device in a wireless network, the code comprising instructions executable by a processor to perform a method of any of aspects 1 through 20.

Aspect 43: An apparatus for wireless communications at a second device in a wireless network, comprising a processor; memory coupled with the processor; and instructions stored in the memory and executable by the processor to cause the apparatus to perform a method of any of aspects 21 through 39.

Aspect 44: An apparatus for wireless communications at a second device in a wireless network, comprising at least one means for performing a method of any of aspects 21 through 39.

Aspect 45: A non-transitory computer-readable medium storing code for wireless communications at a second device in a wireless network, the code comprising instructions executable by a processor to perform a method of any of aspects 21 through 39.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a first device, comprising:
  one or more memories; and
  one or more processors coupled with the one or more memories and configured to cause the first device to:
    transmit, to a second device, a first indication of a sequence of a plurality of beam training phases for a beam training procedure between the first device and the second device, wherein the sequence of the plurality of beam training phases for the beam training procedure is based at least in part on one or more metrics associated with the first device or the second device, and is selected from one or more differently ordered sequences of the plurality of beam training phases;
    receive, from the second device, a second indication corresponding to the beam training procedure in response to the first indication; and
    communicate, based at least in part on the first indication and the second indication and in accordance with the sequence of the plurality of beam training phases, one or more signals with the second device via one or more communication beams to perform the sequence of the plurality of beam training phases as part of the beam training procedure.

2. The apparatus of claim 1, wherein the one or more processors are configured to cause the first device to:
select the sequence of the plurality of beam training phases based at least in part on the one or more metrics associated with the first device or the second device; and
perform the sequence of the plurality of beam training phases as part of the beam training procedure based at least in part on the selection of the sequence of the plurality of beam training phases.

3. The apparatus of claim 1, wherein the one or more processors are configured to cause the first device to:
select the sequence of the plurality of beam training phases based at least in part on a differential between a first quantity of antenna elements at the first device and a second quantity of antenna elements at the second device; and
perform the sequence of the plurality of beam training phases of the beam training procedure at the first device based at least in part on the first quantity of antenna elements that is greater than the second quantity of antenna elements.

4. The apparatus of claim 1, wherein the one or more metrics comprise a first power consumption metric associated with the first device and a second power consumption metric associated with the second device, and wherein the one or more processors are configured to cause the first device to:
select a quantity of symbols to perform the sequence of the plurality of beam training phases based at least in part on a differential between the first power consumption metric associated with the first device and the second power consumption metric associated with the second device.

5. The apparatus of claim 1, wherein the one or more metrics comprise a first thermal metric associated with the first device and a second thermal metric associated with the second device, and wherein the one or more processors are configured to cause the first device to:
select a quantity of symbols to perform the sequence of the plurality of beam training phases based at least in part on a differential between the first thermal metric associated with the first device and the second thermal metric associated with the second device.

6. The apparatus of claim 1, wherein the one or more metrics comprise a first maximum permissible exposure metric associated with the first device and a second maximum permissible exposure metric associated with the second device, and wherein the one or more processors are configured to cause the first device to:
select the sequence of the plurality of beam training phases based at least in part on the first maximum permissible exposure metric, the second maximum permissible exposure metric, or both.

7. The apparatus of claim 1, wherein the one or more metrics comprise a first mobility state associated with the first device and a second mobility state associated with the second device, and wherein the one or more processors are configured to cause the first device to:
receive, from the second device, an indication of the second mobility state associated with the second device; and
select the sequence of the plurality of beam training phases based at least in part on the first mobility state and the second mobility state.

8. The apparatus of claim 7, wherein the one or more processors are configured to cause the first device to:
select the sequence of the plurality of beam training phases based at least in part on the first mobility state corresponding to a lower mobility relative to the second mobility state.

9. The apparatus of claim 7, further comprising:
an antenna, wherein the one or more processors and the antenna are configured to cause the first device to:
transmit, to the second device, an indication of the first mobility state associated with the first device.

10. The apparatus of claim 1, wherein the one or more processors are configured to cause the first device to:
select the sequence of the plurality of beam training phases as part of the beam training procedure based at least in part on a first type of blockage and a second type of blockage.

11. The apparatus of claim 1, wherein the one or more processors are configured to cause the first device to:
select the sequence of the plurality of beam training phases based at least in part on a quantity of antenna elements associated with the first device, the second device, or both, a power consumption differential between the first device and the second device, a thermal differential between the first device and the second device, one or more maximum permissible exposure metrics, a type of blockage for the first device, the second device, or both, a mobility state for the first device, the second device, or both, or any combination thereof.

12. The apparatus of claim 1, wherein the second indication comprises an acknowledgement of the sequence of the plurality of beam training phases, one or more additional beam training phases to be performed by the second device, a modification of the beam training procedure, or any combination thereof.

13. The apparatus of claim 1, wherein the beam training procedure comprises a partial beam training procedure, and wherein the one or more processors are configured to cause the first device to:
select the sequence of the plurality of beam training phases in accordance with a first subset of a total quantity of antenna elements of the first device, a second subset of a total quantity of antenna elements of the second device, or both.

14. The apparatus of claim 1, wherein the beam training procedure comprises a partial beam training procedure, and wherein the one or more processors are configured to cause the first device to:
select the sequence of the plurality of beam training phases in accordance with a first subset of a total quantity of resources allocated for transmissions of the one or more signals by the first device, a second subset of a total quantity of resources allocated for transmissions of the one or more signals by the second device, or both.

15. The apparatus of claim 1, wherein the one or more processors are configured to cause the first device to:
transmit, to the second device, the one or more signals via the one or more communication beams based at least in part on the beam training procedure and in accordance with the sequence of the plurality of beam training phases.

16. The apparatus of claim 1, wherein the one or more processors are configured to cause the first device to:
receive, from the second device, the one or more signals via the one or more communication beams based at least in part on the beam training procedure and in accordance with the sequence of the plurality of beam training phases.

17. The apparatus of claim 1, wherein the one or more processors are configured to cause the first device to:
select a set of antenna element resources or a set of reference signal resources to perform the sequence of the plurality of beam training phases of the beam training procedure, wherein communication of the one or more signals is based at least in part on the set of antenna element resources or the set of reference signal resources.

18. The apparatus of claim 1, wherein the sequence of the plurality of beam training phases comprises a first beam training phase corresponding to a wide beam selection phase, a second beam training phase corresponding to a first beam refinement phase at the first device, and a third beam training phase corresponding to a second beam refinement phase at the second device.

19. The apparatus of claim 1, wherein the sequence of the plurality of beam training phases indicates a device order to perform the plurality of beam training phases at the first device, the second device, or both.

20. The apparatus of claim 1, wherein the one or more processors are configured to cause the first device to:
select the sequence of the plurality of beam training phases based at least in part on a communication link type between the first device and the second device, wherein the communication link type is an integrated access and backhaul link or a sidelink.

21. The apparatus of claim 1, wherein the plurality of beam training phases comprises a procedure 1 (P1) phase, a procedure 2 (P2) phase, and a procedure 3 (P3) phase, and the sequence of the plurality of beam training phases comprises a first order that includes the P2 phase prior to the P3 phase, or a second order that includes the P3 phase prior to the P2 phase.

22. The apparatus of claim 1, wherein the one or more processors are configured to cause the first device to:
communicate an indication of the one or more metrics associated with the first device or the second device; and
select the sequence of the plurality of beam training phases based at least in part on the indication of the one or more metrics associated with the first device or the second device.

23. The apparatus of claim 1, wherein the one or more processors are configured to cause the first device to:
select a second sequence of the plurality of beam training phases to perform as part of the beam training procedure; and
perform the sequence of the plurality of beam training phases and the second sequence of the plurality of beam training phases as part of the beam training procedure.

24. The apparatus of claim 1, wherein the one or more processors are configured to cause the first device to:
perform the sequence of the plurality of beam training phases as part of the beam training procedure, wherein the beam training procedure includes one or more beams from a fixed analog beamforming codebook.

25. An apparatus for wireless communications at a second device, comprising:
one or more memories; and
one or more processors coupled with the one or more memories and configured to cause the second device to:
receive a first indication of a sequence of a plurality of beam training phases for a beam training procedure between the second device and a first device, wherein the sequence of the plurality of beam training phases for the beam training procedure is based at least in part on one or more metrics associated with the first device or the second device, and wherein the sequence of the plurality of beam training phases is one of one or more differently ordered sequences of the plurality of beam training phases;
transmit a second indication corresponding to the beam training procedure in response to the first indication; and
communicate, based at least in part on the first indication and the second indication and in accordance with the sequence of the plurality of beam training phases, one or more signals with the first device via one or more communication beams to perform the sequence of the plurality of beam training phases as part of the beam training procedure.

26. The apparatus of claim 25, wherein the one or more processors are configured to cause the second device to:
perform the sequence of the plurality of beam training phases as part of the beam training procedure based at least in part on the one or more metrics associated with the second device or the first device, wherein the one or more metrics correspond to a differential between a first quantity of antenna elements associated with the first device and a second quantity of antenna elements associated with the second device.

27. The apparatus of claim 26, wherein the one or more metrics comprise a first power consumption metric, a first thermal metric, or a first maximum permissible exposure metric associated with the first device and a second power consumption metric, a second thermal metric, or a second maximum permissible exposure metric associated with the second device, wherein a number of symbols allocated for the plurality of beam training phases is based at least in part on a differential between the first power consumption metric, the first thermal metric, or the first maximum permissible exposure metric associated with the first device and the second power consumption metric, the second thermal metric, or the second maximum permissible exposure metric associated with the second device.

28. The apparatus of claim 26, wherein the one or more metrics comprise a first mobility state associated with the first device and a second mobility state associated with the second device, and wherein the one or more processors are configured to cause the second device to:
transmit, to the first device, an indication of the second mobility state associated with the second device, wherein the plurality of beam training phases is based at least in part on the first mobility state and the second mobility state.

29. A method for wireless communications at a first device, comprising:
transmitting, to a second device, a first indication of a sequence of a plurality of beam training phases for a beam training procedure between the first device and the second device, wherein the sequence of the plurality of beam training phases for the beam training procedure is based at least in part on one or more metrics associated with the first device or the second device, and is selected from one or more differently ordered sequences of the plurality of beam training phases;

receiving, from the second device, a second indication corresponding to the beam training procedure in response to the first indication; and communicating, based at least in part on the first indication and the second indication and in accordance with the sequence of the plurality of beam training phases, one or more signals with the second device via one or more communication beams to perform the sequence of the plurality of beam training phases as part of the beam training procedure.

30. The method of claim 29, further comprising:

selecting the sequence of the plurality of beam training phases based at least in part on the one or more metrics associated with the first device or the second device; and performing the sequence of the plurality of beam training phases as part of the beam training procedure based at least in part on the selection of the sequence of the plurality of beam training phases.

31. The method of claim 29, further comprising:

selecting the sequence of the plurality of beam training phases based at least in part on a differential between a first quantity of antenna elements at the first device and a second quantity of antenna elements at the second device; and performing the sequence of the plurality of beam training phases of the beam training procedure at the first device based at least in part on the first quantity of antenna elements being greater than the second quantity of antenna elements.

32. The method of claim 29, further comprising:

selecting the sequence of the plurality of beam training phases based at least in part on a quantity of antenna elements associated with the first device, the second device, or both, a power consumption differential between the first device and the second device, a thermal differential between the first device and the second device, one or more maximum permissible exposure metrics, a type of blockage for the first device, the second device, or both, a mobility state for the first device, the second device, or both, or any combination thereof.

33. The method of claim 29, further comprising:

selecting the sequence of the plurality of beam training phases based at least in part on a communication link type between the first device and the second device, the communication link type being an integrated access and backhaul link or a sidelink.

34. The method of claim 29, wherein the plurality of beam training phases comprises a procedure 1 (P1) phase, a procedure 2 (P2) phase, and a procedure 3 (P3) phase, and the sequence of the plurality of beam training phases comprises a first order including the P2 phase prior to the P3 phase, or a second order including the P3 phase prior to the P2 phase.

35. A method for wireless communications at a second device, comprising:

receiving a first indication of a sequence of a plurality of beam training phases for a beam training procedure between the second device and a first device, wherein the sequence of the plurality of beam training phases for the beam training procedure is based at least in part on one or more metrics associated with the first device or the second device, and wherein the sequence of the plurality of beam training phases is one of one or more differently ordered sequences of the plurality of beam training phases;

transmitting a second indication corresponding to the beam training procedure in response to the first indication; and communicating, based at least in part on the first indication and the second indication and in accordance with the sequence of the plurality of beam training phases, one or more signals with the first device via one or more communication beams to perform the sequence of the plurality of beam training phases as part of the beam training procedure.

36. The method of claim 35, further comprising:

performing the sequence of the plurality of beam training phases as part of the beam training procedure based at least in part on the one or more metrics associated with the second device or the first device, wherein the one or more metrics correspond to a differential between a first quantity of antenna elements associated with the first device and a second quantity of antenna elements associated with the second device.

37. The method of claim 35, wherein the one or more metrics comprise a first power consumption metric, a first thermal metric, or a first maximum permissible exposure metric associated with the first device and a second power consumption metric, a second thermal metric, or a second maximum permissible exposure metric associated with the second device, wherein a number of symbols allocated for the plurality of beam training phases is based at least in part on a differential between the first power consumption metric, the first thermal metric, or the first maximum permissible exposure metric associated with the first device and the second power consumption metric, the second thermal metric, or the second maximum permissible exposure metric associated with the second device.

38. The method of claim 35, wherein the one or more metrics comprise a first mobility state associated with the first device and a second mobility state associated with the second device, and the method further comprising:

transmitting, to the first device, an indication of the second mobility state associated with the second device, wherein the plurality of beam training phases is based at least in part on the first mobility state and the second mobility state.

* * * * *